(12) United States Patent
Song et al.

(10) Patent No.: US 8,707,391 B2
(45) Date of Patent: Apr. 22, 2014

(54) SUPPORTING A SERVER-ARBITRATED GROUP COMMUNICATION SESSION OVER A LOCAL WIRELESS NETWORK VIA A WIRELESS WIDE AREA NETWORK PROXY CLIENT

(75) Inventors: Bongyong Song, San Diego, CA (US); Yih-Hao Lin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 171 days.

(21) Appl. No.: 13/212,550

(22) Filed: Aug. 18, 2011

(65) Prior Publication Data
US 2013/0044669 A1    Feb. 21, 2013

(51) Int. Cl.
*G06F 7/04* (2006.01)

(52) U.S. Cl.
USPC .............................................................. 726/3

(58) Field of Classification Search
USPC ........................ 726/2, 3, 11, 12; 455/403–466
See application file for complete search history.

(56) References Cited

U.S. PATENT DOCUMENTS

| | | | |
|---|---|---|---|
| 6,181,697 B1 * | 1/2001 | Nurenberg et al. ........... | 370/390 |
| 7,734,710 B2 | 6/2010 | Seligmann et al. | |
| 7,821,988 B1 | 10/2010 | Gunasekara et al. | |
| 7,860,490 B2 * | 12/2010 | Maes ............................ | 455/418 |
| 7,870,380 B2 * | 1/2011 | VanHeyningen et al. ..... | 713/151 |
| 2007/0105579 A1 | 5/2007 | Shaffer et al. | |
| 2007/0220573 A1 | 9/2007 | Chiussi et al. | |
| 2008/0171567 A1 | 7/2008 | Kossi et al. | |

FOREIGN PATENT DOCUMENTS

| | | |
|---|---|---|
| EP | 1915000 A1 | 4/2008 |
| WO | 2006088181 | 8/2006 |

OTHER PUBLICATIONS

International Search Report and Written Opinion—PCT/US2012/051515—ISA/EPO—Feb. 8, 2013.

* cited by examiner

*Primary Examiner* — Fan Ng
(74) *Attorney, Agent, or Firm* — Raphael Freiwirth

(57) ABSTRACT

In an embodiment, a proxy client is positioned within a local wireless network (e.g., a Wireless Local Area Network (WLAN)) and maintains a connection to an application server in a Wireless Wide Area Network (WWAN) that is separate from the local wireless network. The application server arbitrates group communication sessions between a plurality of user equipments (UEs). An Internet Protocol (IP) unicast connection is established between the proxy client and the application server. The proxy client associates with at least one of the UEs over the local wireless network, and notifies the application server of the association. The application server sends, to the proxy client, traffic associated with a group communication session to the associated UE(s). The proxy client re-transmits the received traffic via IP multicast over the wireless network.

43 Claims, 15 Drawing Sheets

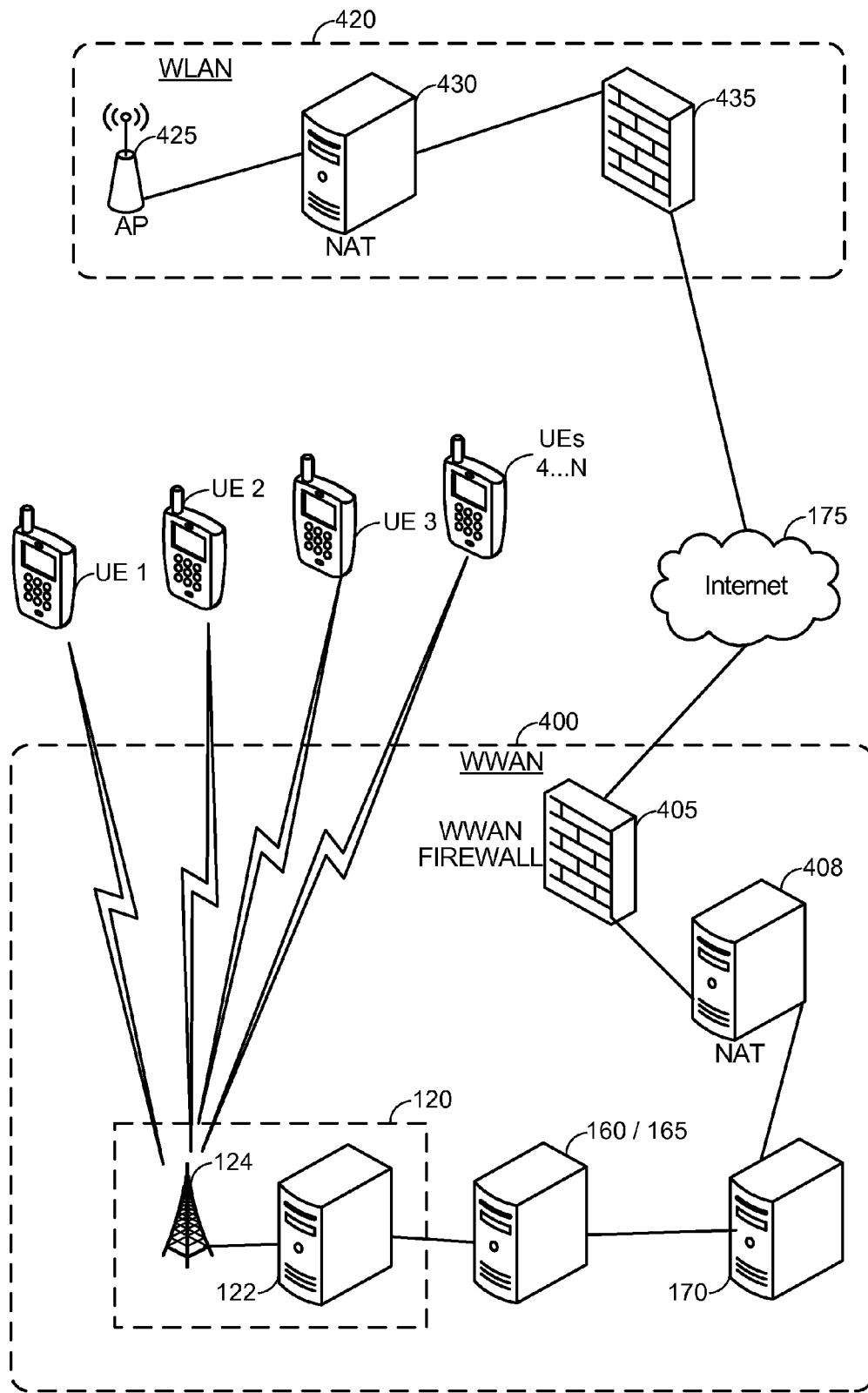
*FIG. 4A – WWAN-BASED SOLUTION*

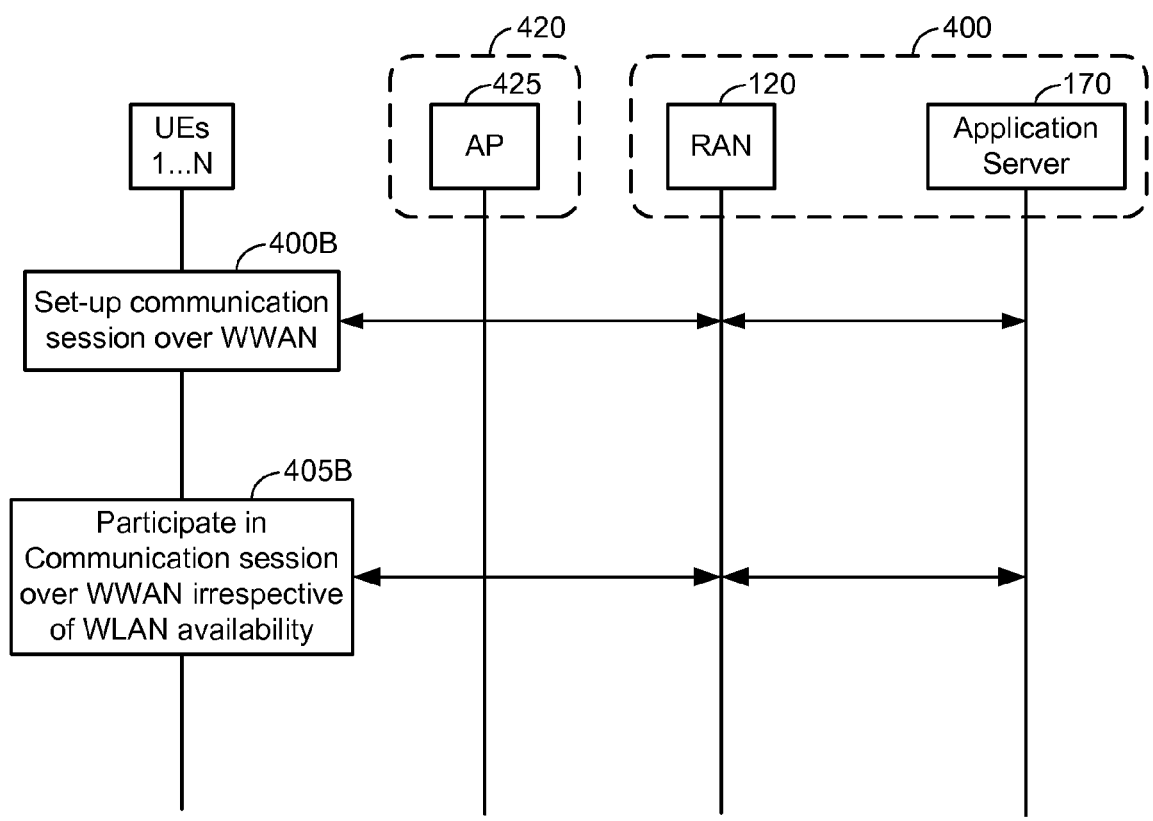
FIG. 4B – WWAN-BASED SOLUTION

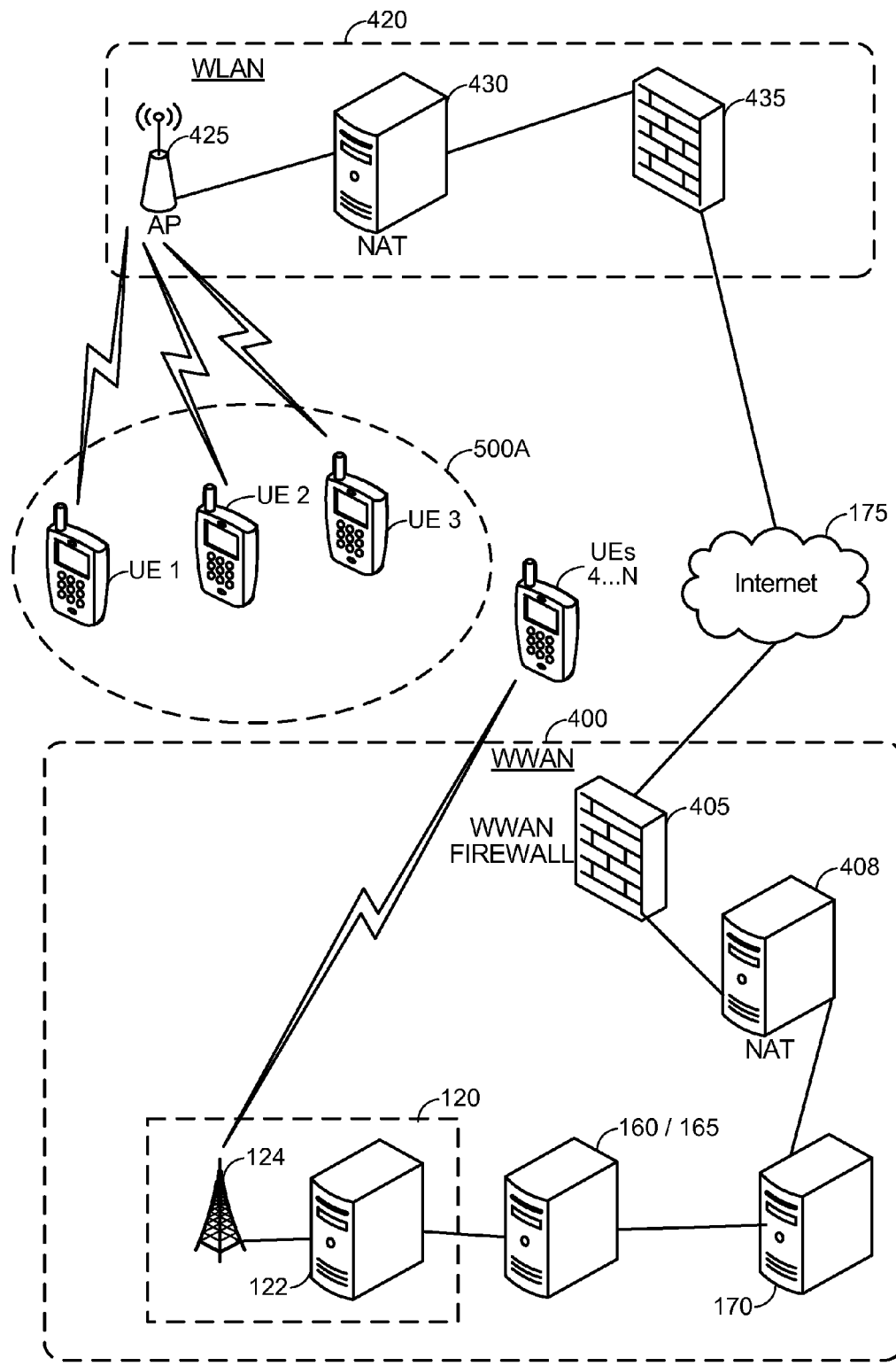
FIG. 5A – HYBRID WWAN/WLAN-BASED SOLUTION

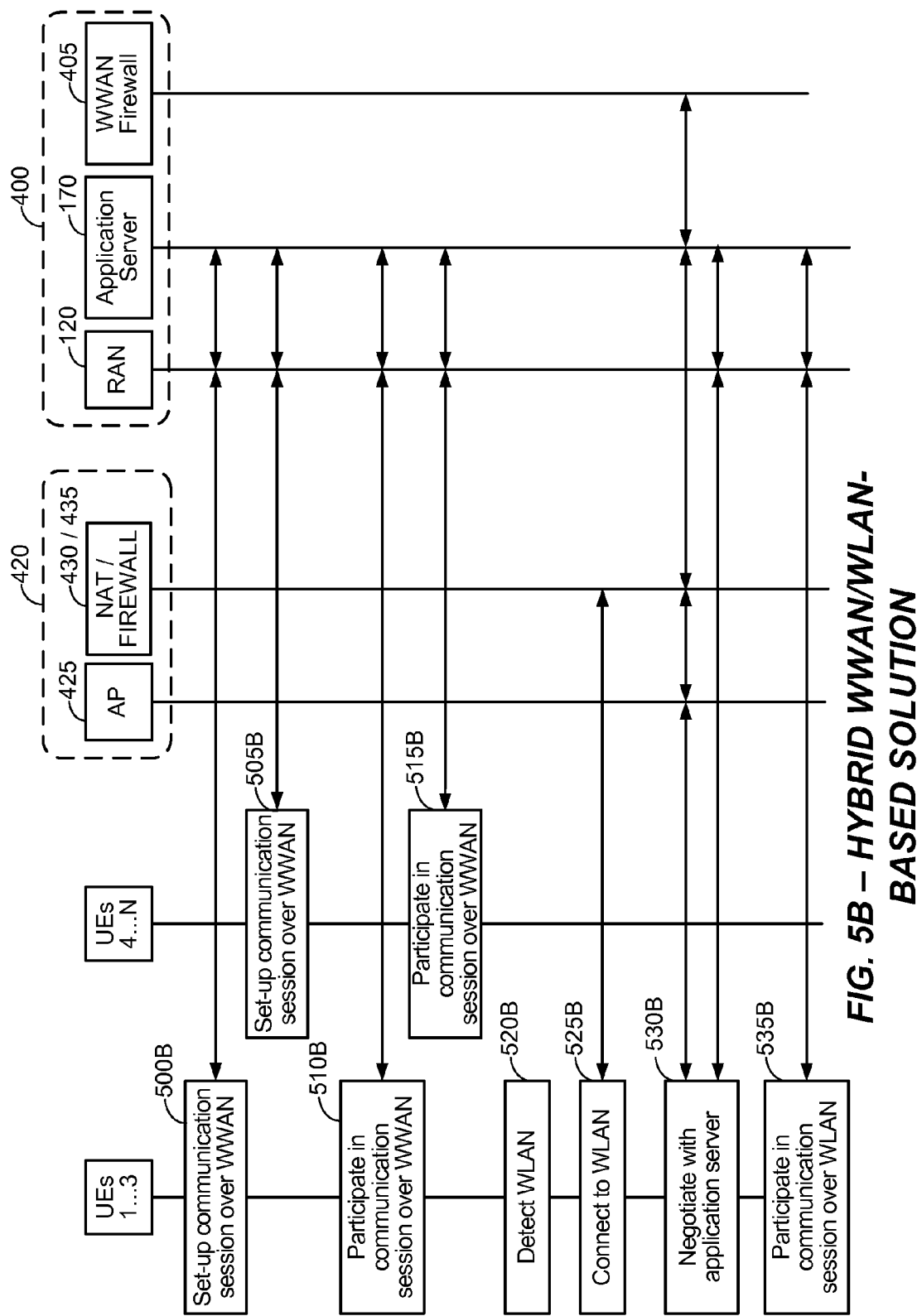
FIG. 5B – HYBRID WWAN/WLAN-BASED SOLUTION

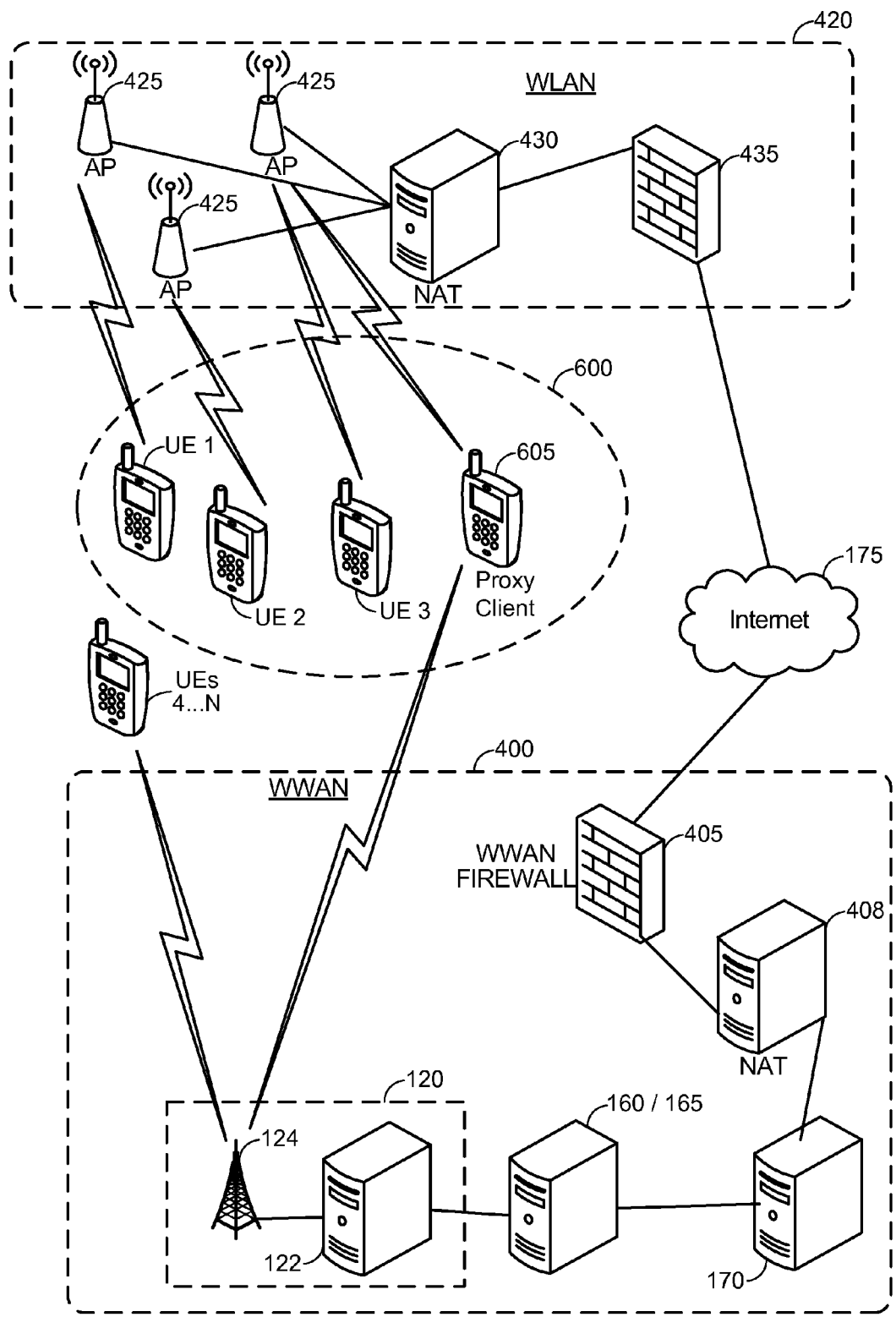
*FIG. 6 – WLAN/WWAN HYBRID SOLUTION WITH WWAN PROXY*

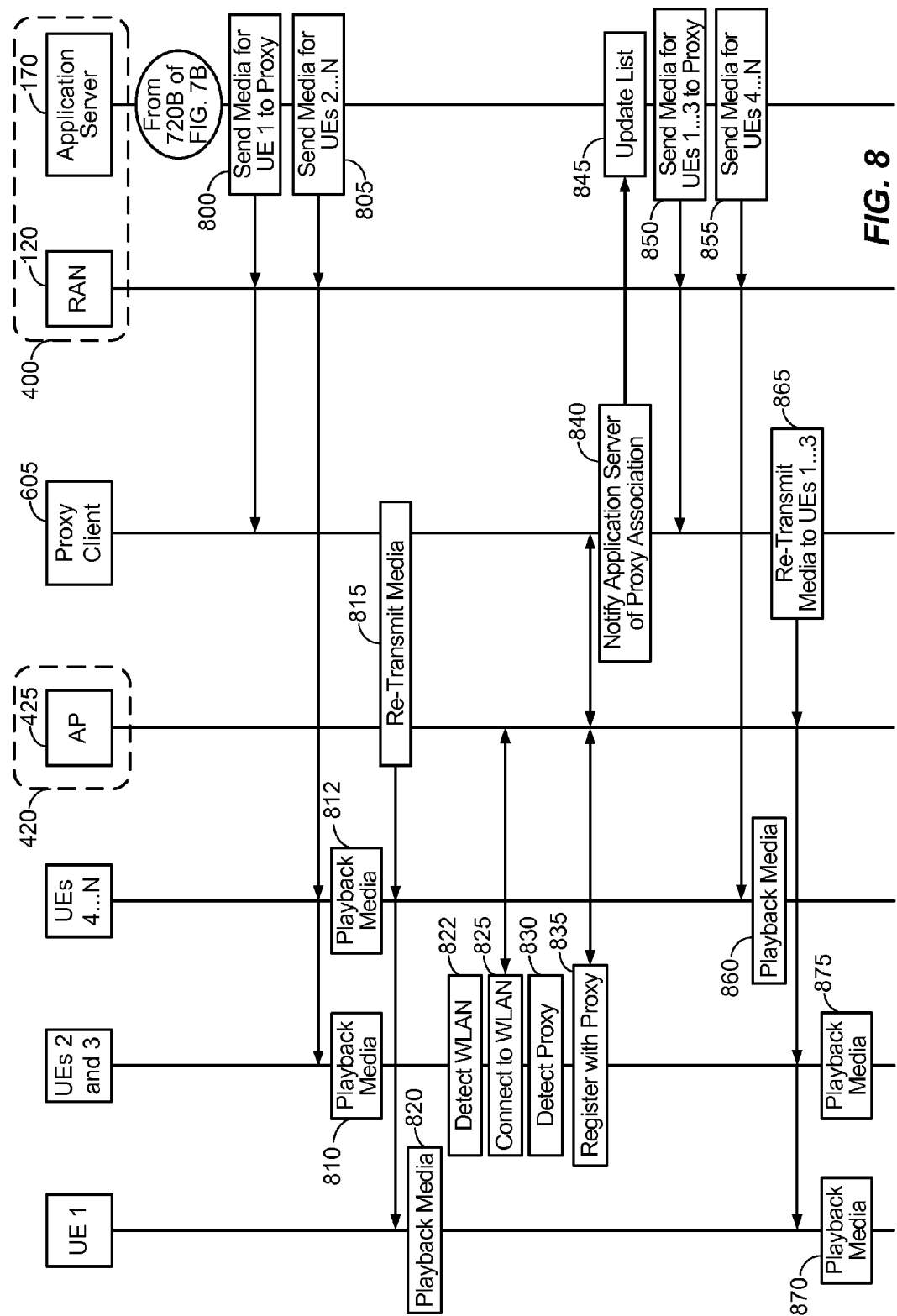

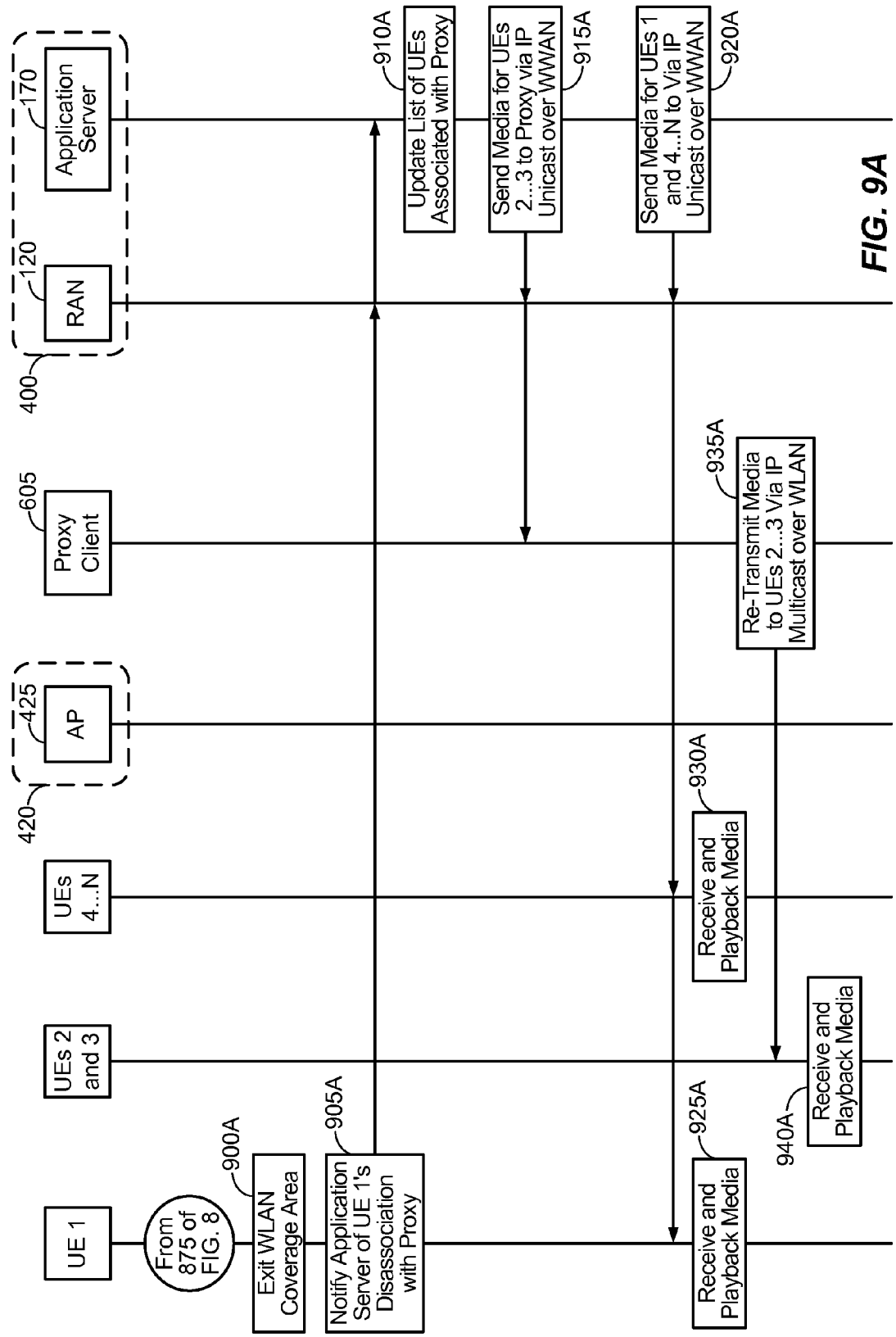

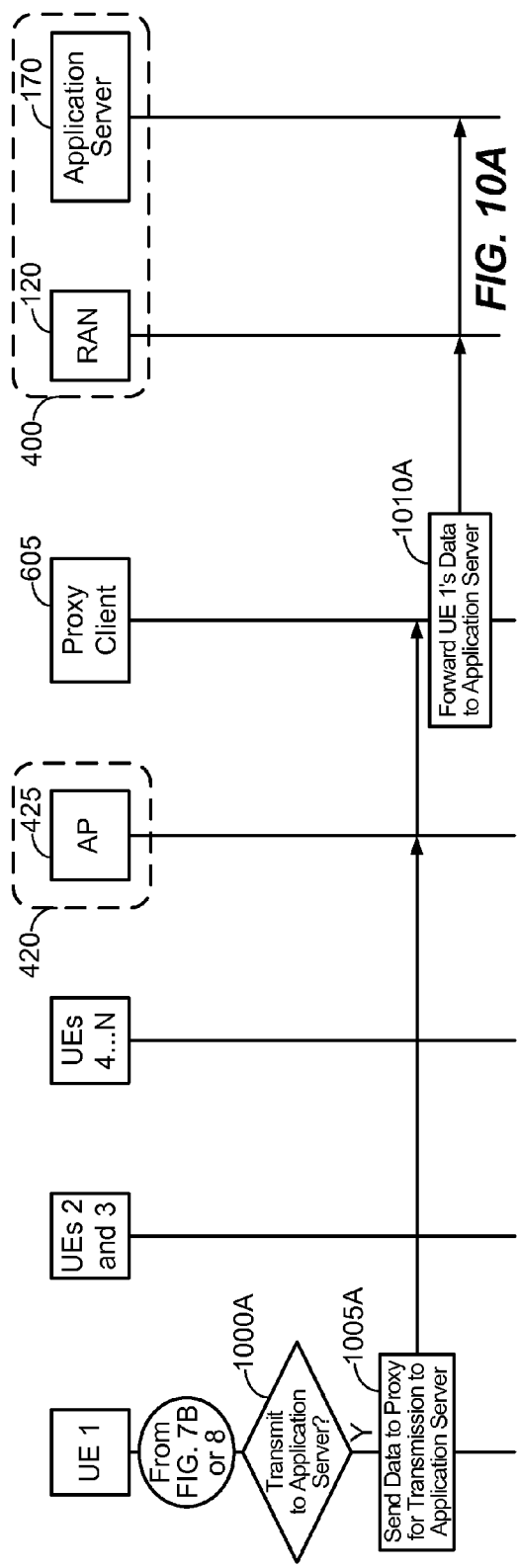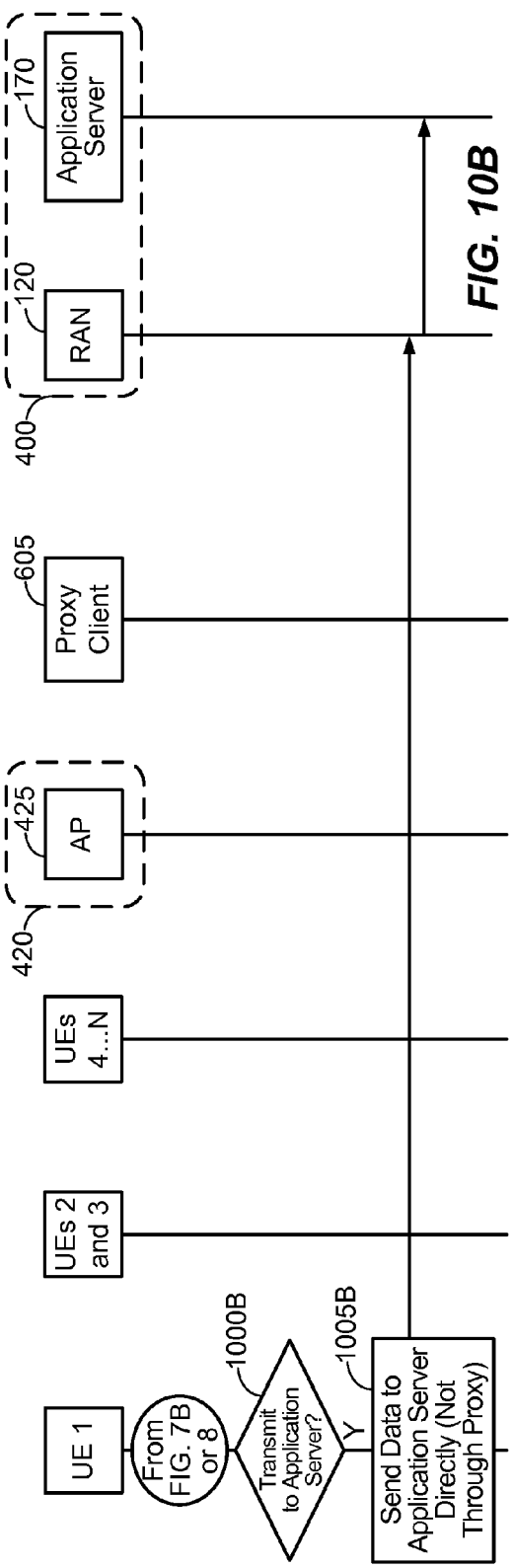

SUPPORTING A SERVER-ARBITRATED GROUP COMMUNICATION SESSION OVER A LOCAL WIRELESS NETWORK VIA A WIRELESS WIDE AREA NETWORK PROXY CLIENT

BACKGROUND OF THE INVENTION

1. Field of the Invention

Embodiments relate to supporting a server-arbitrated group communication session over a local wireless network via a wireless wide area network (WWAN) proxy client.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (W-CDMA), CDMA2000 (such as CDMA2000 1xEV-DO standards, for example) or TD-SCDMA.

In W-CDMA wireless communication systems, user equipments (UEs) receive signals from fixed position Node Bs (also referred to as cell sites or cells) that support communication links or service within particular geographic regions adjacent to or surrounding the base stations. Node Bs provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the Node Bs generally interacts with UEs through an over the air interface and with the RAN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as W-CDMA, CDMA, FDMA, TDMA, GSM, etc. In a dispatch model, communication between endpoints (e.g., UEs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

SUMMARY

In an embodiment, a proxy client is positioned within a local wireless network (e.g., a Wireless Local Area Network (WLAN)) and maintains a connection to an application server in a Wireless Wide Area Network (WWAN) that is separate from the local wireless network. The application server arbitrates group communication sessions between a plurality of user equipments (UEs). An Internet Protocol (IP) unicast connection is established between the proxy client and the application server. The proxy client associates with at least one of the UEs over the local wireless network, and notifies the application server of the association. The application server sends, to the proxy client, traffic associated with a group communication session to the associated UE(s). The proxy client re-transmits the received traffic via IP multicast over the wireless network.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which:

FIG. 4A illustrates the wireless communication system of FIG. 1 in accordance with another embodiment of the invention.

FIG. 4B illustrates a Wireless Wide Area Network (WWAN) based session support implementation for a server arbitrated group communication session.

FIG. 5A illustrates another wireless communications system that is similar to the system of FIG. 4A in terms of infrastructure.

FIG. 5B illustrates a hybrid WLAN-WWAN session support implementation for a server arbitrated group communication session.

FIG. 6 illustrates another wireless communications system that is similar to the system of FIG. 4A in terms of infrastructure that shows wireless connections for user equipments (UEs) in accordance with an embodiment of the invention.

FIG. 8 illustrates a continuation of the process of FIG. 7B in accordance with an embodiment of the invention.

FIG. 9A illustrates a continuation of the process of FIG. 8 in accordance with an embodiment of the invention.

FIG. 10A is directed to an implementation whereby reverse-link data is transmitted from a UE to the application server via the proxy client in accordance with an embodiment of the invention.

FIG. 10B is directed to an implementation whereby reverse-link data is transmitted from a UE to the application server without traversing the proxy client in accordance with an embodiment of the invention.

DETAILED DESCRIPTION

Figure 1:
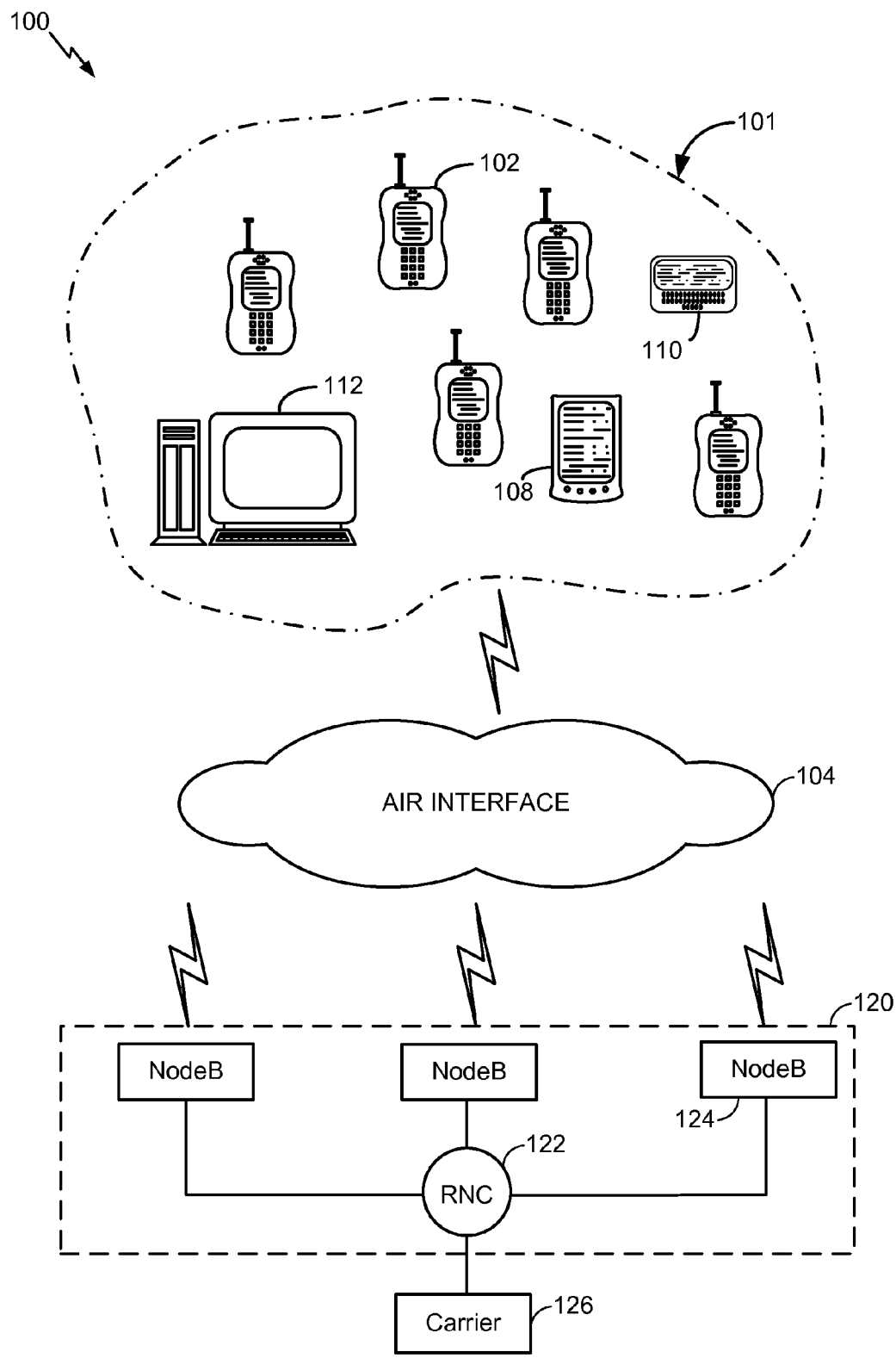
FIG. 1 is a diagram of a wireless network architecture that supports user equipments and radio access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of non-transitory computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple UEs.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal", "AT", "wireless device", "client device", "mobile terminal", "mobile station" and variations thereof.

Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2A:
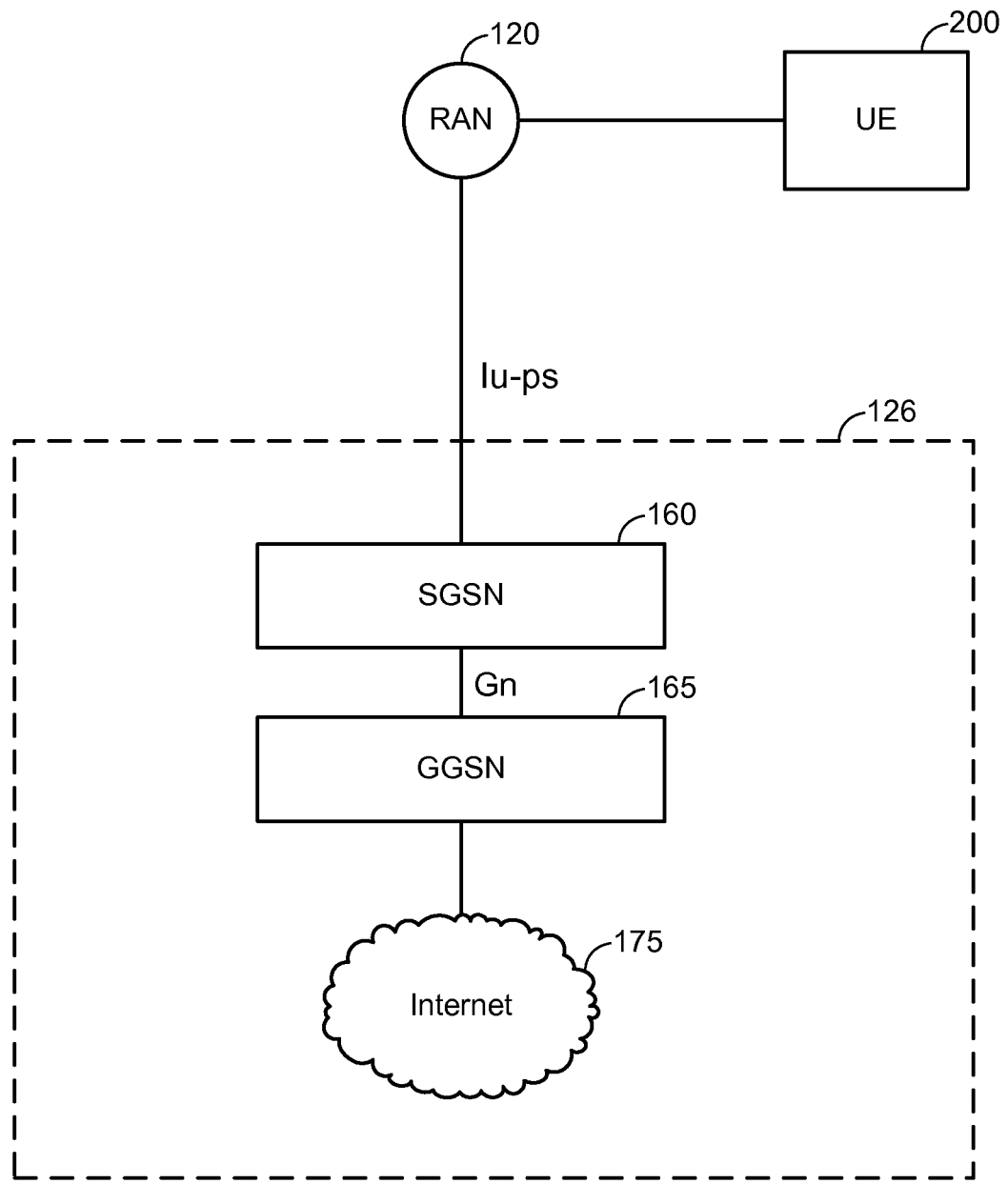
FIG. 2A illustrates the core network of FIG. 1 according to an embodiment of the present invention.

FIG. 2A illustrates the core network 126 according to an embodiment of the present invention. In particular, FIG. 2A illustrates components of a General Packet Radio Services (GPRS) core network implemented within a W-CDMA system. In the embodiment of FIG. 2A, the core network 126 includes a Serving GPRS Support Node (SGSN) 160, a Gateway GPRS Support Node (GGSN) 165 and an Internet 175. However, it is appreciated that portions of the Internet 175 and/or other components may be located outside the core network in alternative embodiments.

Generally, GPRS is a protocol used by Global System for Mobile communications (GSM) phones for transmitting Internet Protocol (IP) packets. The GPRS Core Network (e.g., the GGSN 165 and one or more SGSNs 160) is the centralized part of the GPRS system and also provides support for W-CDMA based 3G networks. The GPRS core network is an integrated part of the GSM core network, provides mobility management, session management and transport for IP packet services in GSM and W-CDMA networks.

The GPRS Tunneling Protocol (GTP) is the defining IP protocol of the GPRS core network. The GTP is the protocol which allows end users (e.g., access terminals) of a GSM or W-CDMA network to move from place to place while continuing to connect to the internet as if from one location at the GGSN 165. This is achieved transferring the subscriber's data from the subscriber's current SGSN 160 to the GGSN 165, which is handling the subscriber's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2A, the GGSN 165 acts as an interface between the GPRS backbone network (not shown) and the external packet data network 175. The GGSN 165 extracts the packet data with associated packet data protocol (PDP) format (e.g., IP or PPP) from the GPRS packets coming from the SGSN 160, and sends the packets out on a corresponding packet data network. In the other direction, the incoming data packets are directed by the GGSN 165 to the SGSN 160 which manages and controls the Radio Access Bearer (RAB) of the destination UE served by the RAN 120. Thereby, the GGSN 165 stores the current SGSN address of the target UE and his/her profile in its location register (e.g., within a PDP context). The GGSN is responsible for IP address assignment and is the default router for the connected UE. The GGSN also performs authentication and charging functions.

The SGSN 160 is representative of one of many SGSNs within the core network 126, in an example. Each SGSN is responsible for the delivery of data packets from and to the UEs within an associated geographical service area. The tasks of the SGSN 160 includes packet routing and transfer, mobility management (e.g., attach/detach and location management), logical link management, and authentication and charging functions. The location register of the SGSN stores location information (e.g., current cell, current VLR) and user profiles (e.g., IMSI, PDP address(es) used in the packet data network) of all GPRS users registered with the SGSN 160, for example, within one or more PDP contexts for each user or UE. Thus, SGSNs are responsible for (i) de-tunneling downlink GTP packets from the GGSN 165, (ii) uplink tunnel IP packets toward the GGSN 165, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in Universal Mobile Telecommunications System (UMTS) system architecture) communicates with the SGSN 160 via a Iu interface, with a transmission protocol such as Frame Relay or IP. The SGSN 160 communicates with the GGSN 165 via a Gn interface, which is an IP-based interface between SGSN 160 and other SGSNs (not shown) and internal GGSNs, and uses the GTP protocol defined above (e.g., GTP-U, GTP-C, GTP', etc.). While not shown in FIG. 2A, the Gn interface is also used by the Domain Name System (DNS). The GGSN 165 is connected to a Public Data Network (PDN) (not shown), and in turn to the Internet 175, via a Gi interface with IP protocols either directly or through a Wireless Application Protocol (WAP) gateway.

The PDP context is a data structure present on both the SGSN 160 and the GGSN 165 which contains a particular UE's communication session information when the UE has an active GPRS session. When a UE wishes to initiate a GPRS communication session, the UE must first attach to the SGSN 160 and then activate a PDP context with the GGSN 165. This allocates a PDP context data structure in the SGSN 160 that the subscriber is currently visiting and the GGSN 165 serving the UE's access point.

Figure 2B:
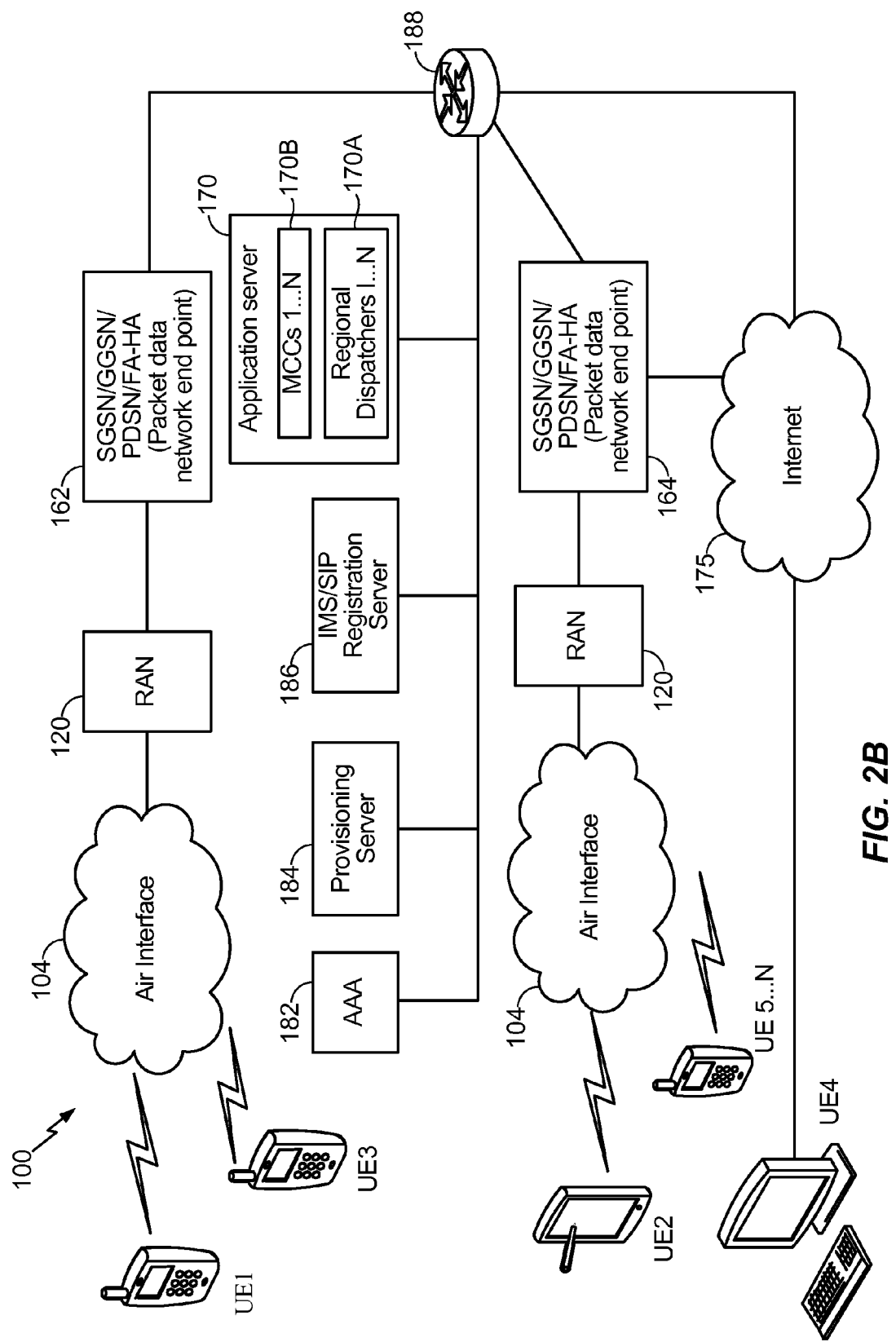
FIG. 2B illustrates an example of the wireless communications system of FIG. 1 in more detail.

FIG. 2B illustrates an example of the wireless communications system 100 of FIG. 1 in more detail. In particular, referring to FIG. 2B, UEs 1 . . . N are shown as connecting to the RAN 120 at locations serviced by different packet data network end-points. The illustration of FIG. 2B is specific to W-CDMA systems and terminology, although it will be appreciated how FIG. 2B could be modified to confirm with a 1x EV-DO system. Accordingly, UEs 1 and 3 connect to the RAN 120 at a portion served by a first packet data network end-point 162 (e.g., which may correspond to SGSN, GGSN, PDSN, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. UEs 2 and 5 . . . N connect to the RAN 120 at a portion served by a second packet data network end-point 164 (e.g., which may correspond to SGSN, GGSN, PDSN, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. UE 4 connects directly to the Internet 175, and through the Internet 175 can then connect to any of the system components described above.

Referring to FIG. 2B, UEs 1, 3 and 5 ... N are illustrated as wireless cell-phones, UE 2 is illustrated as a wireless tablet-PC and UE 4 is illustrated as a wired desktop station. However, in other embodiments, it will be appreciated that the wireless communication system 100 can connect to any type of UE, and the examples illustrated in FIG. 2B are not intended to limit the types of UEs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Further, referring to FIG. 2B, the application server 170 is illustrated as including a plurality of media control complexes (MCCs) 1 ... N 170B, and a plurality of regional dispatchers 1 ... N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between UEs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the UEs, scheduling and/or sending announce messages, etc.), whereas the MCCs 170B are responsible for hosting the communication session for the duration of the call instance, including conducting an in-call signaling and an actual exchange of media during an arbitrated communication session.

Figure 3:
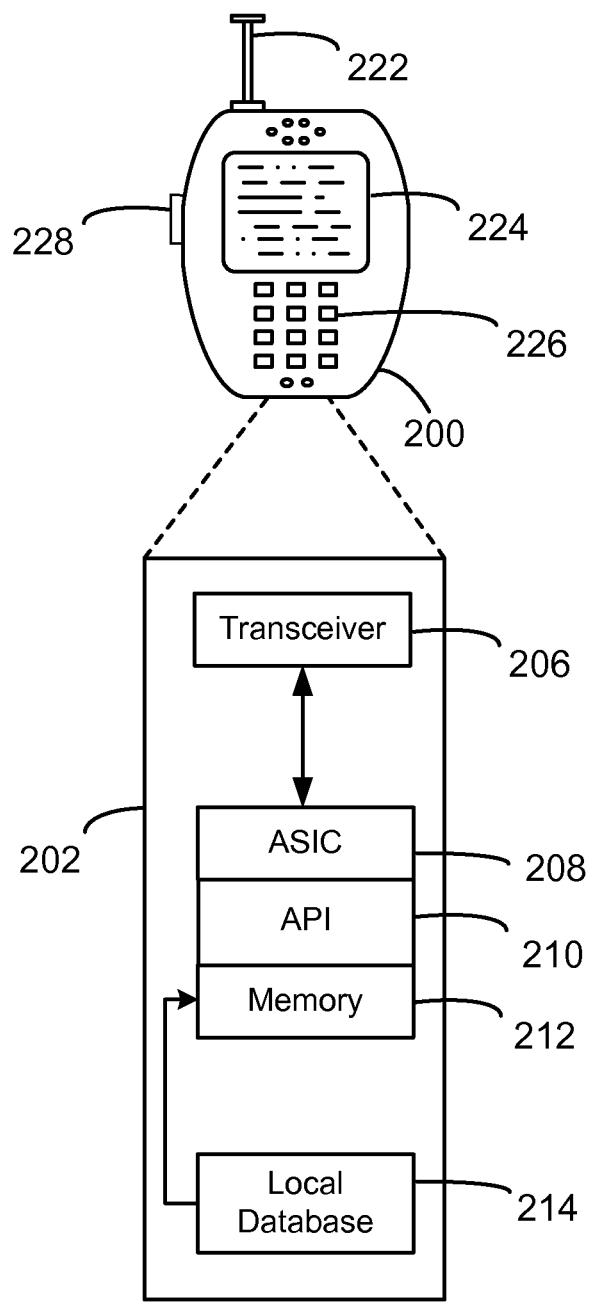
FIG. 3 is an illustration of user equipment in accordance with at least one embodiment of the invention.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. For example, in W-CDMA, the data communication is typically between the client device 102, Node B(s) 124, and the RNC 122. The RNC 122 can be connected to multiple data networks such as the core network 126, PSTN, the Internet, a virtual private network, a SGSN, a GGSN and the like, thus allowing the UE 102 or 200 access to a broader communication network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Below, embodiments of the invention are generally described in accordance with W-CDMA protocols and associated terminology (e.g., such as UE instead of mobile station (MS), mobile unit (MU), access terminal (AT), etc., RNC, contrasted with BSC in EV-DO, or Node B, contrasted with BS or MPT/BS in EV-DO, etc.). However, it will be readily appreciated by one of ordinary skill in the art how the embodiments of the invention can be applied in conjunction with wireless communication protocols other than W-CDMA.

In a conventional server-arbitrated communication session (e.g., via half-duplex protocols, full-duplex protocols, VoIP, a group session over IP unicast, a group session over IP multicast, a push-to-talk (PTT) session, a push-to-transfer (PTX) session, etc.), a session or call originator sends a request to initiate a communication session to the application server 170, which then forwards a call announcement message to the RAN 120 for transmission to one or more targets of the call.

User Equipments (UEs), in a Universal Mobile Telecommunications Service (UMTS) Terrestrial Radio Access Network (UTRAN) (e.g., the RAN 120) may be in either an idle mode or a radio resource control (RRC) connected mode.

Based on UE mobility and activity while in a RRC connected mode, the RAN 120 may direct UEs to transition between a number of RRC sub-states; namely, CELL_PCH, URA_PCH, CELL_FACH, and CELL_DCH states, which may be characterized as follows:

In the CELL_DCH state, a dedicated physical channel is allocated to the UE in uplink and downlink, the UE is known on a cell level according to its current active set, and the UE has been assigned dedicated transport channels, downlink and uplink (TDD) shared transport channels, and a combination of these transport channels can be used by the UE.

In the CELL_FACH state, no dedicated physical channel is allocated to the UE, the UE continuously monitors a forward access channel (FACH), the UE is assigned a default common or shared transport channel in the uplink (e.g., a random access channel (RACH), which is a contention-based channel with a power ramp-up procedure to acquire the channel and to adjust transmit power) that the UE can transmit upon according to the access procedure for that transport channel, the position of the UE is known by RAN 120 on a cell level according to the cell where the UE last made a previous cell update, and, in TDD mode, one or several USCH or DSCH transport channels may have been established.

In the CELL_PCH state, no dedicated physical channel is allocated to the UE, the UE selects a PCH with the algorithm, and uses DRX for monitoring the selected PCH via an associated PICH, no uplink activity is possible and the position of the UE is known by the RAN 120 on cell level according to the cell where the UE last made a cell update in CELL_FACH state.

In the URA_PCH state, no dedicated channel is allocated to the UE, the UE selects a PCH with the algorithm, and uses DRX for monitoring the selected PCH via an associated PICH, no uplink activity is possible, and the location of the UE is known to the RAN 120 at a Registration area level according to the UTRAN registration area (URA) assigned to the UE during the last URA update in CELL_FACH state.

Accordingly, URA_PCH State (or CELL_PCH State) corresponds to a dormant state where the UE periodically wakes up to check a paging indicator channel (PICH) and, if needed, the associated downlink paging channel (PCH), and it may enter CELL_FACH state to send a Cell Update message for the following event: cell reselection, periodical cell update, uplink data transmission, paging response, re-entered service area. In CELL_FACH State, the UE may send messages on the random access channel (RACH), and may monitor a forward access channel (FACH). The FACH carries downlink communication from the RAN 120, and is mapped to a secondary common control physical channel (S-CCPCH). From CELL_FACH State, the UE may enter CELL_DCH state after a traffic channel (TCH) has been obtained based on messaging in CELL_FACH state. A table showing conventional dedicated traffic channel (DTCH) to transport channel mappings in radio resource control (RRC) connected mode, is in Table 1 as follows:

TABLE 1

DTCH to Transport Channel mappings in RRC connected mode

|  | RACH | FACH | DCH | E-DCH | HS-DSCH |
| --- | --- | --- | --- | --- | --- |
| CELL_DCH | No | No | Yes | Yes | Yes |
| CELL_FACH | Yes | Yes | No | Yes (rel. 8) | Yes (rel. 7) |
| CELL_PCH | No | No | No | No | Yes (rel.7) |
| URA_PCH | No | No | No | No | No | wherein the notations (rel. 8) and (rel. 7) indicate the associated 3GPP release where the indicated channel was introduced for monitoring or access.

FIG. 4A illustrates the wireless communication system of FIG. 1 in accordance with another embodiment of the invention. As shown in FIG. 4A, UEs 1 . . . N, which may each be configured as UE 200 shown in FIG. 3 in an example, are configured to connect to a Wireless Wide Area Network (WWAN) 400 via a Node B 124 within the RAN 120 and a Wireless Local Area Network (WLAN) 420 via a WLAN Access Point (AP) 425 (e.g., a WiFi hotspot or router). The network components of the WWAN 400, which may correspond to a service provider network, include the RAN 120, the SGSN and GGSN 160 and 165 and the application server 170, as discussed above with respect to FIGS. 1, 2A and 2B. In FIG. 4A, the WWAN 400 further includes a WWAN firewall 405, which may also be referred to as a service provider firewall, and a Network Address Translation (NAT) component 408. While the NAT 408 and WWAN firewall 405 are illustrated as separate entities or components in FIG. 4A, it will be appreciated that their respective functions can be consolidated into a single server or switch in other embodiments of the invention (e.g., such as routing unit 188 of FIG. 2B, for example). The functionality of the NAT 408 is described in more detail below with respect to NAT 430 that is positioned within the WLAN 420.

As will be appreciated by one of ordinary skill in the art, firewalls can be implemented in hardware, software or a combination of both. Firewalls are frequently used to prevent unauthorized Internet users from accessing private networks, in this case the service provider network or WWAN 400, that are connected to the Internet 175. The WWAN firewall 405 is configured to permit or deny network transmissions based upon a set of rules and other criteria. All messages entering or leaving the WWAN 400 via the Internet 175 pass through the WWAN firewall 405, which inspects each message and blocks those that do not meet the specified security criteria.

By punching through the WWAN firewall 405, the application server 170 can access the Internet 175. As shown in FIG. 4A, the Internet 175 is connected to both WWAN 400 and WLAN 420. Through the Internet 175, the application server 170 of the WWAN 400 is theoretically connected to the WLAN 420, although it will be appreciated that the WLAN 420 has its own security (e.g., a NAT/Firewall) that may block access.

Turning to the WLAN 420, the WLAN 420 includes the WLAN AP 425 (e.g., a WiFi router or hotspot, etc.) that was mentioned above, and further includes a Network Address Translation (NAT) component 430 and a WLAN firewall 435, which may alternatively be referred to as an Internet Service Provider (ISP) firewall. While the NAT 430 and WLAN firewall 435 are illustrated as separate entities or components in FIG. 4A, it will be appreciated that their respective functions can be consolidated into a single server or switch in other embodiments of the invention (e.g., such as routing unit 188 of FIG. 2B, for example).

Referring to FIG. 4A, NAT 430 and WLAN firewall 435 separate the WLAN 420 from the Internet 175 and/or other core networks or WLANs. For example, the NAT 430 can be configured to modify network address information in datagram (IP) packet headers such that outgoing Internet Protocol (IP) packets from the WLAN 420 appear to originate from the NAT 430 instead of the originator of the IP-packet (e.g., one of UEs 1 . . . N), and incoming IP packets appear to terminate at the NAT 430. The NAT 430 can be implemented in accordance with any of a variety of schemes of translating addresses and/or port numbers, with each type of NAT-scheme affecting application communication protocols differently. For example, NAT-types include full-cone NAT (also known as one-to-one NAT), address-restricted cone NAT, port-restricted cone NAT and symmetric NAT.

With respect to the WLAN firewall 435, the WLAN firewall 435 can be implemented in hardware, software or a combination of both. Firewalls are frequently used to prevent unauthorized Internet users from accessing private networks, such as intranets, that are connected to the Internet 175. The WLAN firewall 435 is configured to permit or deny network transmissions based upon a set of rules and other criteria. All messages entering or leaving the WLAN 420 pass through the WLAN firewall 435, which inspects each message and blocks those that do not meet the specified security criteria. Further, the WLAN firewall 435 provides private addresses as defined in RFC 1918 to the hosts protected behind the WLAN firewall 435. Once a pass through connection is opened through the WLAN firewall 435, NAT translation association for the data session is often released by the NAT 430 within a few seconds of data inactivity for the session. Thus, the NAT 430 and WLAN Firewall 435 are used to collectively refer to the hardware and/or software that performs the firewall and NAT functions for a particular intranet, in this case the WLAN 420.

It will be appreciated from a review of FIG. 4A that each of UEs 1 . . . N are shown as connected to the RAN 120 of the WWAN 400 in FIG. 4A. The WWAN-connections of UEs 1 . . . N are directed to a WWAN-based session support implementation that is described in more detail below with respect to FIG. 4B.

FIG. 4B illustrates a WWAN-based session support implementation for a server arbitrated group communication session. Referring to FIG. 4B, a given originating UE among UEs 1 . . . N sets up a group communication session between UEs 1 . . . N over the WWAN 400 that is arbitrated by the application server 170, 400B. Accordingly, each of UEs 1 . . . N are WWAN clients that exchange signaling messages and/or media associated with the group communication session over the WWAN 400 during the group communication session, 405B. Because FIG. 4B is representative of a WWAN-specific session support implementation, it will be appreciated that UEs 1 . . . N do not transition to the WLAN 420 for supporting the group communication session, even when the WLAN 420 is available.

Referring to FIG. 4B, the WWAN-only approach is simple and straight-forward to implement and raises no issues with regard to resolving the NAT 430 and/or firewall 435 within the WLAN 420. However, while relatively simple to implement, the WWAN-only approach is also not very scalable. For example, for N group members, the downlink bandwidth consumption between the RAN 120 and UEs 1 . . . N in an IP unicasting implementation is N×B, where B is the downlink bandwidth allocated to each UE. As N increases, more precious bandwidth of the WWAN 420 is consumed. Also, while the bandwidth-consumption issue associated with group communication sessions can be mitigated somewhat if the RAN 120 is configured to support IP multicasting protocols, the current deployment of broadcast/multicast systems that support IP multicasting is relatively low.

FIG. 5A illustrates a wireless communications system that is similar to the system of FIG. 4A in terms of infrastructure. However, in FIG. 5A, UEs 1 . . . 3 are shown as connected to the WLAN 420 within a coverage area 500A of the AP 425, and UEs 4 . . . N are shown as connected to the WWAN 400 via the RAN 120 as in FIG. 4A. The respective WLAN and WWAN connections of UEs 1 . . . N as shown in FIG. 5A are directed to a hybrid WLAN-WWAN session support implementation that is described in more detail below with respect to FIG. 5B.

FIG. 5B illustrates a hybrid WLAN-WWAN session support implementation for a server arbitrated group communication session. Referring to FIG. 5B, a given originating UE among UEs 1 . . . N sets up a group communication session between UEs 1 . . . N over the WWAN 400 that is arbitrated by the application server 170, 500B and 505B. Accordingly, at this point, each of UEs 1 . . . N are WWAN clients that exchange signaling messages and/or media associated with the group communication session over the WWAN 400 during the group communication session, 510B and 515B.

Referring to FIG. 5B, at some later point in time, assume that UEs 1 . . . 3 detect the WLAN 420 via AP 425, 520B, and that UEs 1 . . . 3 connect to the WLAN 420, 525B. Once UEs 1 . . . 3 are connected to the WLAN 420, UEs 1 . . . 3 negotiate with the application server 170 to transition their respective session support for the group communication session from the WWAN 400 to the WLAN 420, 530B. For example, the negotiation of 530B can include, for each of UEs 1 . . . 3, opening the NAT 430 and firewall 435 for traffic between UEs 1 . . . 3 within the WLAN 420 and the WWAN 400, and also opening WWAN firewall 405 and NAT 408 within the WWAN 400 so traffic from the WLAN 420 is not blocked by the WWAN 400.

It will be appreciated that the WLAN 420 generally is associated with more scalability and capacity as compared to the WWAN 400, and also has lower associated bandwidth costs. However, the negotiation of 530B can be relatively complicated to achieve and there is no explicit guarantee that the negotiation will be successful for each of UEs 1 . . . 3. For example, the negotiation shown at 530B relies upon the deployment of application layer gateways (ALGs) within the Internet 175 as well as specialized procedures within both the WLAN 420 and WWAN 400. If either the WLAN or WWAN fail to implement these specialized procedures and/or the ALGs are not available, the negotiation of 530B may fail and UEs 1 . . . 3 may be unable to transition their session from the WWAN 400 to the WLAN 420.

Assuming that UEs 1 . . . 3 are able to set-up a connection to the application server 170 via the WLAN 420, UEs 1 . . . 3 will continue in the group communication session by exchanging signaling messages and/or media associated with the group communication session over the WLAN 420, 535B, while UEs 4 . . . N continue to participate in the group communication session via the WWAN 400.

Accordingly, the WWAN-specific approach described above with respect to FIGS. 4A and 4B is simple to implement, but cannot leverage the enhanced bandwidth, improved latency performance and lower costs that are associated with WLANs. Also, the hybrid WLAN-WWAN approach described above with respect to FIGS. 5A and 5B can be difficult to implement, especially when firewalls and/or NATs are present within the WLAN 420 and/or the WWAN 400.

Embodiments of the invention are directed to a hybrid WWAN-WLAN session support implementation for a group communication session arbitrated by the application server 170 whereby a proxy client of the application server 170 maintains a connection to the WWAN 400. Instead of setting up separate connections for each UE that is attempting to connect to the application server 170, the UEs instead connect to the proxy client, which functions as a proxy for the application server 170 within the WLAN 420. The application server 170 maintains a single IP unicast connection (e.g., via the WWAN 400 or the WLAN 420) to the proxy client which is configured to carry all traffic for UEs that are served by the proxy client within the WLAN 420 in association with a particular group communication session. Thus, as UEs are added and/or removed to the group communication session via the WLAN 420, the respective UEs need not negotiate with the application server 170 for a separate connection and instead are simply added to or removed from the proxy client's group of supported UEs within the WLAN 420.

Further, while the embodiments described below are primarily directed to an implementation whereby the proxy client 605 maintains a WWAN IP unicast connection to the application server 170, in other embodiments the proxy client 605 may instead be connected to the application server 170 via a WLAN IP unicast connection.

Referring to FIG. 6, the infrastructure contained within WLAN 420 and WWAN 400 is for the most part similar to FIG. 4A and/or FIG. 5A. However, in FIG. 6, UEs 1 . . . 3 are shown as connected to different APs 425 within WLAN 420. Thus, coverage area 600 is representative of the collective coverage areas of a plurality of APs of the WLAN 420 that are each behind the NAT 430 and firewall 435, and is not necessarily restricted to the coverage area of one particular AP 425. However, it is also possible in another implementation that each UE connects to the WLAN 420 via a single AP 425 and/or that WLAN 420 only includes a single AP 425. Collectively, the set of AP(s) 425 that are behind the NAT 430 and firewall 435 of the WLAN 420 may correspond to a customer premise that includes geographically co-located UEs expected to, from time to time, participate in group communication sessions with each other (e.g., employees at a particular job-site, etc.).

Also illustrated in FIG. 6 is a proxy client 605. The proxy client 605 corresponds to a UE that is positioned within the coverage area 600 of the WLAN 420 and is also positioned within a coverage area (not shown) of the WWAN 400. The proxy client 605 is configured to connect to both the WLAN 420 and WWAN 400 concurrently. While the proxy client 605 is illustrated in FIG. 6 as a wireless communications device, it will be appreciated that in another embodiment of the invention the proxy client 605 may be connected to the WLAN 420 via a wired connection and can form part of the infrastructure of the WLAN 420. In an example, the proxy client can correspond to a wireless communication device or UE that is positioned in the coverage area 600 specifically to facilitate its function as a proxy can thereby be considered a dedicated proxy client. In another example, the proxy client can correspond to an ad hoc proxy client in the sense that the proxy client is loaded onto a UE that is also used for other purposes, such as a subscriber device. It will be appreciated that if the proxy client is loaded onto a UE that is participating in a communication session for which the UE is also acting as proxy, a proxy election mechanism may be implemented so that the session can recover if the UE loses its connection to the WLAN 420.

As will be described in greater detail below with respect to FIGS. 7A through 10B, the proxy client is configured to be the point-of-contact for the application server 170 to UEs that are supported by the WLAN 420 during group communication sessions that are arbitrated by the application server 170. The proxy client 605 is configured to establish an IP unicast connection to the application server 170 through the WWAN 400 for receiving media for any of the UEs supported via the WLAN 420. For downlink media traffic of a particular group communication session, the application server 170 can send a single instance of the downlink media traffic via the IP unicast connection to the proxy client 605, and the proxy client 605 can then re-transmit the downlink traffic within the WLAN 425 (e.g., via one or more of APs 425) using IP multicasting protocols. In an alternative embodiment, the IP unicast connection between the proxy client 605 and application server 170 can instead be carried over the WLAN 420 and the Internet 175. In this case, it will be appreciated that the proxy client 605 may first have to overcome the NAT/Firewalls of the WLAN 420 and/or the WWAN 400 in order to facilitate this connection, as discussed above with respect to FIGS. 5A and 5B. Thus, at a high level, the embodiments of the invention are directed to a proxy client that functions as a single point of contact for the application server 170 to provide coverage to a number of UEs behind a WLAN, and the connection between the proxy client and the application server 170 can be configured in a number of different ways.

Figure 7A:
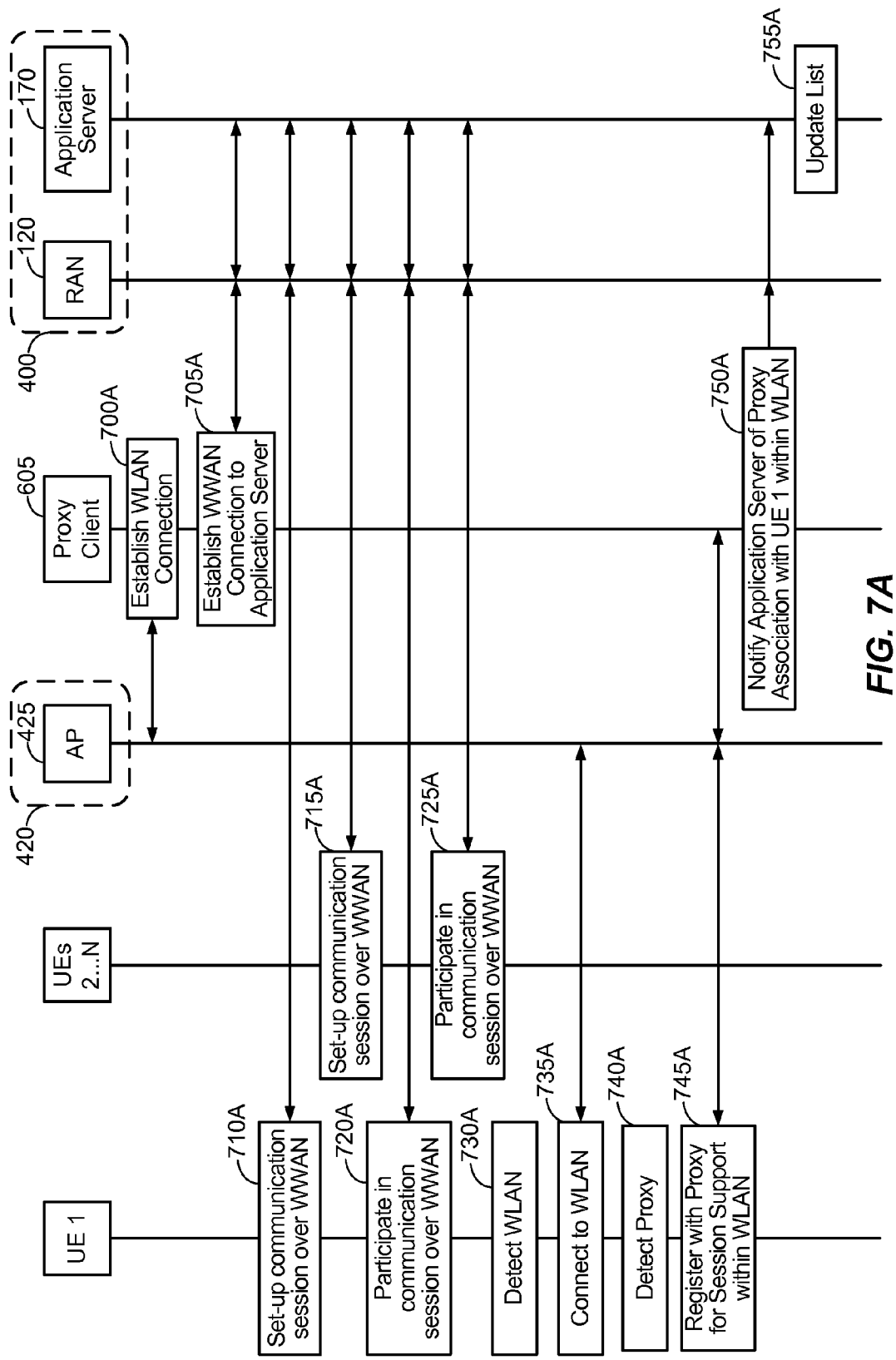
FIG. 7A illustrates a process of supporting a group communication session arbitrated by an application server via a proxy client in accordance with an embodiment of the invention.

FIG. 7A illustrates a process of supporting a group communication session arbitrated by the application server 170 via the proxy client 605 of FIG. 6 in accordance with an embodiment of the invention.

Referring to FIG. 7A, the proxy client 605 establishes a connection to the WLAN 420, 700A, and also establishes a connection over the WWAN 400 to the application server 170, 705A. At some later point in time, a given originating UE among UEs 1 . . . N sets up a group communication session between UEs 1 . . . N over the WWAN 400 that is arbitrated by the application server 170, 710A and 715A. Accordingly, at this point, the proxy client 605 is not supporting the group communication session over the WLAN 420 and instead each of UEs 1 . . . N are WWAN clients that exchange signaling messages and/or media associated with the group communication session over the WWAN 400 during the group communication session, 720A and 725A.

Referring to FIG. 7A, at some later point in time during the group communication session, assume that UE 1 detects the WLAN 420 via one of the APs 425 within the coverage area 600, 730A, and that UE 1 connects to the WLAN 420, 735A. Once UE 1 is connected to the WLAN 420, instead of attempting to set-up its own independent connection to the application server 170 via the WLAN 420 as discussed above with respect to FIG. 5B, UE 1 detects the presence of the proxy client 605 within the WLAN 420, 740A.

Referring to 740A of FIG. 7A, in an example, UE 1 may detect the proxy client 605 by receiving a periodic proxy announcement message sent by the proxy client 605. The proxy client 605 will send this proxy announcement message as a broadcast or multicast message and this will be broadcast or multicast by the AP(s) 425. Alternatively, UE 1 can first send the proxy-ping message as a broadcast (or multicast) message which will be broadcast (or multicast) by the AP(s) 425. Once hearing this message, the proxy client 605 will respond to UE 1 and UE 1 detects the proxy client 605.

After detecting the proxy client 605, UE 1 registers with the proxy client 605 in order to transition UE 1's support for the group communication session from the WWAN 400 to the WLAN 420 via the proxy client 605, 745A. For example, during the registration of 745A, as will be described in greater detail below with respect to FIG. 7B, UE 1 may be provisioned with a multicast media access control (MAC) ID used to identify IP multicast traffic associated with the group communication session within the WLAN 420. After UE 1 registers with the proxy client 605, the proxy client 605 notifies the application server 170, via the WWAN connection of the proxy client 605, that UE 1 is associated with the proxy client 605 within the WLAN 420, 750A. The application server 170 receives the notification from the proxy client 605 and updates a list of UEs that are determined to be associated with, or supported by, the proxy client 605 within the WLAN 420, 755A. While not shown explicitly within FIG. 7A, the notification of 750A may function as a trigger for the application server 170 to stop supporting the group communication session to UE 1 via the WWAN 400 and to begin supporting the group communication session to UE 1 via the WLAN 420 through the proxy client 605.

Figure 7B:
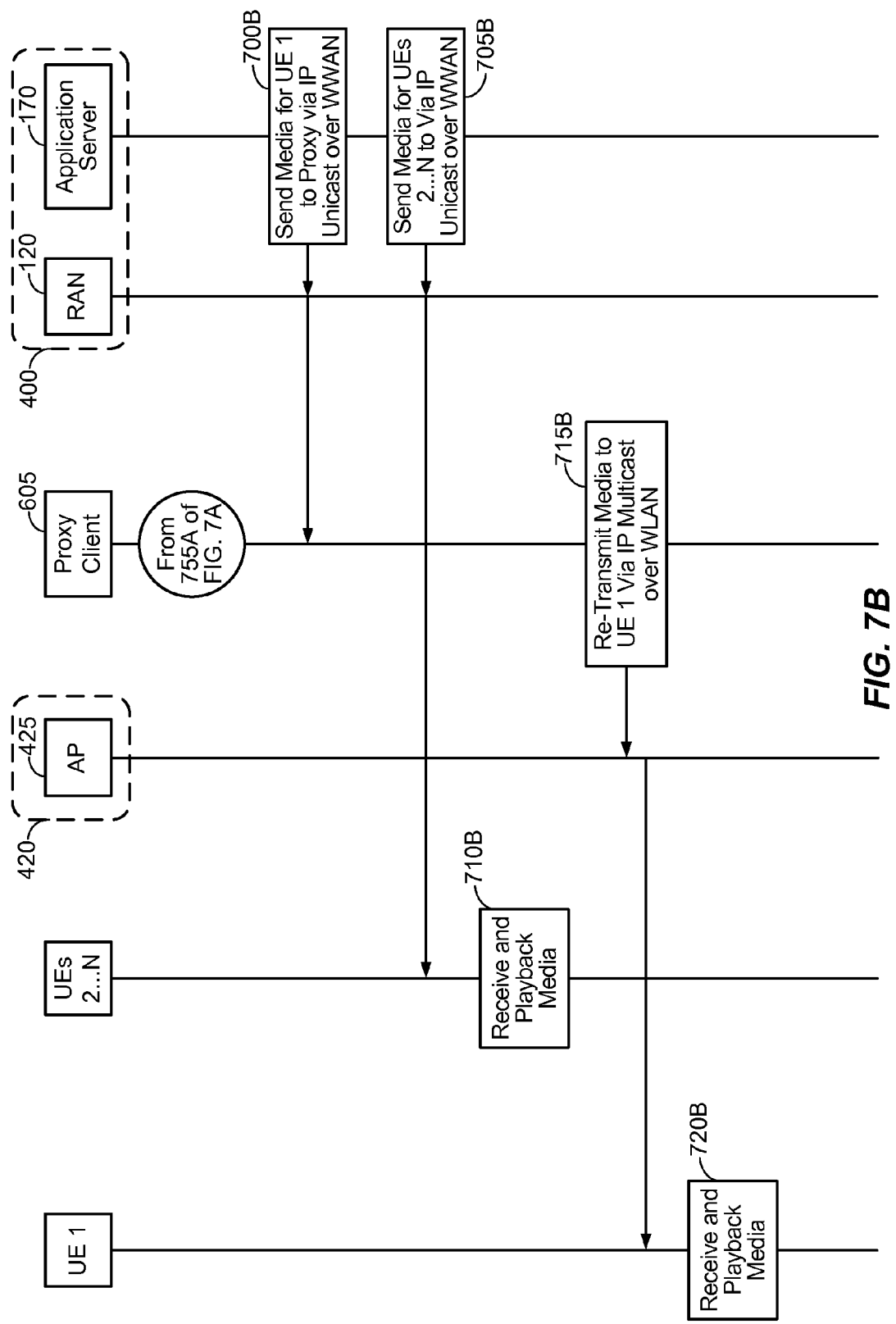
FIG. 7B illustrates a continuation of the process of FIG. 7A in accordance with an embodiment of the invention.

FIG. 7B illustrates a continuation of the process of FIG. 7A in accordance with an embodiment of the invention. Referring to FIG. 7B, the proxy client 605 notifies the application server 170 that UE 1 is connected to the WLAN 420 and can be served by the proxy client 605, the application server 170 begins to transmit media for the group communication session to the proxy client 605 over the WWAN-based IP unicast connection, 700B. The application server 170 also continues to send the same media for the group communication session to UEs 2 . . . N over the WWAN 400 via IP unicasting protocols, 705B. UEs 2 . . . N receive the media over the WWAN 400 from the application server 170 and playback the received media in 710B.

Upon receiving the media from the application server 170 in 700B, the proxy client 605 re-transmits the media to UE 1 via IP multicasting protocols, 715B. For example, during the registration of UE 1 with the proxy client 605 in 745A of FIG. 7A, the proxy client 605 may inform UE 1 of a multicast identifier, such as a media access control (MAC) identifier, for multicast traffic associated with the group communication session within the WLAN 420. UE 1 may then begin to monitor for any traffic directed to the group or multicast MAC ID from the AP(s) 425 of the WLAN 420. At 715B, the proxy client 605 can request that the AP(s) 425 of the WLAN 420 transmit the media in data packets that include the multicast MAC ID of the group communication session in a header portion. In 720B, UE 1 receives the media re-transmitted on behalf of the proxy client 605 from a current serving AP 425, identifies the multicast MAC ID contained therein and then plays back the received media. Accordingly, the proxy client 605 can receive a single IP unicast stream of the session traffic from the application server 170 (e.g., in this example, over the WWAN) and then re-transmit or echo this session traffic throughout the coverage area 600 of the WLAN 420 via the AP(s) 425 using IP multicasting protocols.

In an example, UE 1 may complete its transition from WWAN-support for the communication session to proxy-support for the communication session either responsive to an ACK to its registration with the proxy in 745A of FIG. 7A, or alternatively upon receipt of session media from the proxy in 705B. Thus, until the ACK and/or the session media is received at UE 1, UE 1 may remain in the session as a WWAN-based participant.

FIG. 8 illustrates a continuation of the process of FIG. 7B in accordance with an embodiment of the invention. In particular, FIG. 8 illustrates an expansion of the UEs supported by the proxy client 605 within the WLAN 420 for the group communication session from UE 1 to UEs 1 . . . 3.

Referring to FIG. 8, the application server 170 continues to transmit media for the group communication session to the proxy client 605 over the WWAN-based IP unicast connection, 800, and the application server 170 also continues to send the same media for the group communication session to UEs 2 . . . N over the WWAN 400 via IP unicasting protocols, 805. UEs 2 . . . N receive the media over the WWAN 400 from the application server 170 and playback the received media in 810 and 812. Upon receiving the media from the application server 170 in 800, the proxy client 605 re-transmits the media to UE 1 via IP multicasting protocols over the WLAN 420, 815, as discussed above with respect to 715B of FIG. 7B. In 820, UE 1 receives the media re-transmitted on behalf of the proxy client 605 from a current serving AP 425, identifies the multicast MAC ID contained therein and then plays back the received media, similar to 720B of FIG. 7B.

800 through 820 of FIG. 8 are then repeated for a given period of time during the group communication session. At some later point in time during the group communication session, assume that UEs 2 and 3 detect the WLAN 420 via one of the AP(s) 425 within the coverage area 600, 822, and that UEs 2 and 3 each connect to the WLAN 420 via respective AP(s) 425, 825. Once UEs 2 and 3 are connected to the WLAN 420, instead of attempting to set-up their own independent connections to the application server 170 via the WLAN 420 as discussed above with respect to FIG. 5B, UEs 2 and 3 each detect the presence of the proxy client 605 within the WLAN 420, 830. For example, the detection of the presence of the proxy client 605 by UEs 2 and 3 at 830 may be performed in a similar manner as discussed above with respect to UE 1 at 740A of FIG. 7A.

After detecting the proxy client 605, UEs 2 and 3 each register with the proxy client 605 in order to transition the support of UEs 2 and 3 for the group communication session from the WWAN 400 to the WLAN 420 via the proxy client 605, 835. For example, during the registration of 835, UEs 2 and 3 may each be provisioned with a multicast MAC ID used to identify IP multicast traffic associated with the group communication session within the WLAN 420.

After UEs 2 and 3 register with the proxy client 605, the proxy client 605 notifies the application server 170, via the WWAN connection of the proxy client 605, that UEs 2 and 3 are now associated with the proxy client 605 within the WLAN 420, 840. The application server 170 receives the notification from the proxy client 605 and updates a list of UEs that are determined to be associated with, or supported by, the proxy client 605 within the WLAN 420, 845. In this case, the application server 170 updates the list of UEs associated with the proxy client 605 to reflect that UEs 1 . . . 3 are each being supported by the proxy client 605 within the WLAN 420. While not shown explicitly within FIG. 8, the notification of 840 may function as a trigger for the application server 170 to stop supporting the group communication session to UEs 2 and 3 via the WWAN 400 and to begin supporting the group communication session to UEs 2 and 3 via the WLAN 420 through the proxy client 605.

At this point, the application server 170 will simply use the pre-established WWAN-based IP unicast connection to the proxy client 605 (which is already being used for supporting UE 1) for supporting UEs 2 and 3 as well. Accordingly, the application server 170 continues to transmit media for the group communication session to the proxy client 605 over the WWAN-based IP unicast connection, 850. For example, the manner in which the IP unicast traffic carrying the media for the group communication session in 850 need not change in 850 as compared to 800, although it will be appreciated that the media of 850 is targeted for each of UEs 1 . . . 3 instead of only UE 1. In other words, only a single media stream is conveyed from the application server 170 to the proxy client 605, whereby the proxy client 605 will then re-transmit this media stream to each of its supported UEs via IP multicasting over the WLAN 420. Also, the application server 170 can discontinue its support of UEs 2 and 3 via the WWAN 400, such that the overall level of backhaul traffic transmitted by the application server 170 is reduced.

Referring to FIG. 8, in addition to transmitting the stream of media for the group communication session to the proxy client 605 within the WLAN 420, the application server 170 also continues to send the same media for the group communication session to UEs 4 . . . N over the WWAN 400 via IP unicasting protocols, 855. UEs 4 . . . N receive the media over the WWAN 400 from the application server 170 and playback the received media in 860.

Upon receiving the media from the application server 170 in 850, the proxy client 605 re-transmits the media to UEs 1 . . . 3 via IP multicasting protocols over the WLAN 420, 865. For example, as discussed above, UEs 1 . . . 3 may be notified of the multicast MAC ID for the group communication session during their respective registrations with the proxy client 605, and UEs 1 . . . 3 may then begin to monitor for any traffic directed to the group or multicast MAC ID from the AP(s) 425 of the WLAN 420. At 865, the proxy client 605 can request that the AP(s) 425 of the WLAN 420 transmit the media in data packets that include the multicast MAC ID of the group communication session in a header portion. In 870 and 875, UEs 1 . . . 3 each receive the media re-transmitted on behalf of the proxy client 605 from respective serving AP(s) 425, UEs 1 . . . 3 identify the multicast MAC ID contained therein and UEs 1 . . . 3 then playback the received media. Accordingly, the proxy client 605 can receive a single IP unicast stream of the session traffic from the application server 170 (e.g., over the WWAN, in this example) and then re-transmit or echo this session traffic throughout the coverage area 600 of the WLAN 420 via the AP(s) 425 using IP multicasting protocols, in this case to UEs 1 . . . 3. As will be appreciated by one of ordinary skill in the art, the connections between UEs 1 . . . N and the proxy client 605 to the WWAN 400 and/or the WLAN 420 as shown in FIG. 6 are representative of the state of the group communication session after the process of FIG. 8 is executed.

FIG. 9A illustrates a continuation of the process of FIG. 8 in accordance with an embodiment of the invention. In particular, FIG. 9A illustrates a scenario whereby UE 1 loses its connection to the WLAN 420 and thereby drops its association with the proxy client 605, and UE 1 notifies the application server 170 regarding UE 1's disassociation from the proxy client 605.

Referring to FIG. 9A, at some point after 875 of FIG. 8, assume that UE 1 exits the coverage area 600 of the WLAN 420, 900A. Accordingly, UE 1 is now unable to receive the IP multicast traffic that is re-transmitted by the proxy client 605 throughout the coverage area 600 of the WLAN 420. Upon detecting UE 1's disconnection from the WLAN 420, UE 1 reestablishes its own independent connection to the WWAN 400, if necessary, and then transmits a notification over the WWAN 400 to the application server 170 that indicates UE 1 is no longer associated with the proxy client 605 within the WLAN 420, 905A. The application server 170 receives the notification from UE 1 and updates a list of UEs that are determined to be associated with, or supported by, the proxy client 605 within the WLAN 420, 910A. In this case, the application server 170 updates the list of UEs associated with the proxy client 605 to reflect that UEs 2 and 3 (and not UE 1) are being supported by the proxy client 605 within the WLAN 420. The notification of 905A may function as a trigger for the application server 170 to renew its support of the group communication session to UE 1 via the WWAN 400.

Accordingly, the application server 170 continues to transmit media for the group communication session to the proxy client 605 over the WWAN-based IP unicast connection, 915A. For example, the manner in which the IP unicast traffic carrying the media for the group communication session need not change in 915A as compared to 850 of FIG. 8, although it will be appreciated that the media of 915A is targeted for UEs 2 and 3 instead of UEs 1 . . . 3.

Referring to FIG. 9A, in addition to transmitting the stream of media for the group communication session to the proxy client 605 over the WWAN-based IP unicast connection, the application server 170 also sends the same media for the group communication session to UEs 1 and 4 . . . N over the WWAN 400 via IP unicasting protocols, 920A. UEs 1 and 4 . . . N receive the media over the WWAN 400 from the application server 170 and playback the received media in 925A and 930A.

Upon receiving the media from the application server 170 in 915A, the proxy client 605 re-transmits the media to UEs 2 . . . 3 via IP multicasting protocols over the WLAN 420, 935A. For example, as discussed above, UEs 2 . . . 3 may be notified of the multicast MAC ID for the group communication session during their respective registrations with the proxy client 605, and UEs 2 . . . 3 may then begin to monitor for any traffic directed to the group or multicast MAC ID from the AP(s) 425 of the WLAN 420. At 935A, the proxy client 605 can request that the AP(s) 425 of the WLAN 420 transmit the media in data packets that include the multicast MAC ID of the group communication session in a header portion. In 940A, UEs 2 . . . 3 each receive the media re-transmitted on behalf of the proxy client 605 from respective serving AP(s) 425, UEs 2 . . . 3 identify the multicast MAC ID contained therein and UEs 2 . . . 3 then playback the received media.

Figure 9B:
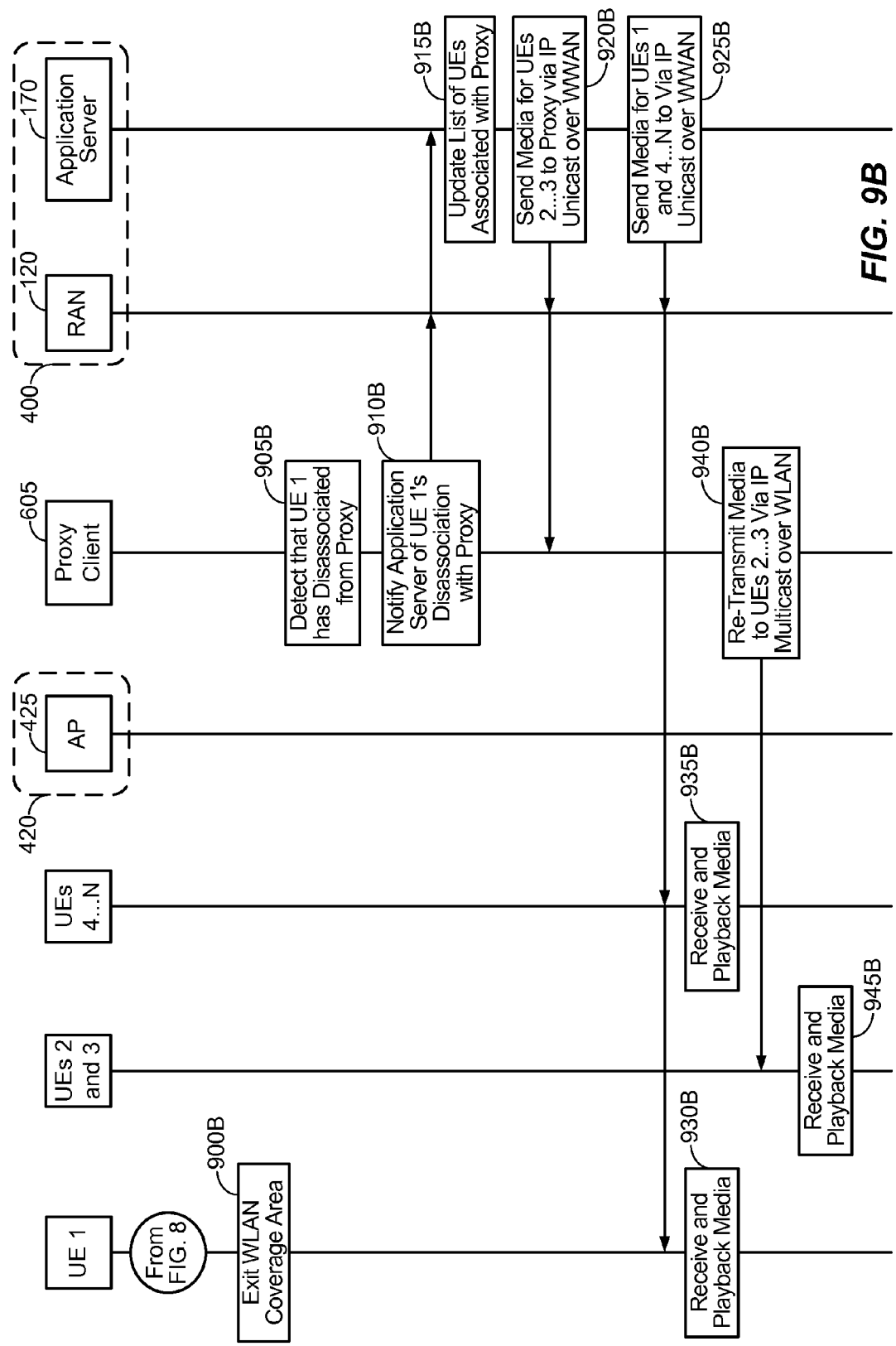
FIG. 9B illustrates a continuation of the process of FIG. 8 in accordance with another embodiment of the invention.

FIG. 9B illustrates a continuation of the process of FIG. 8 in accordance with another embodiment of the invention. In particular, FIG. 9B illustrates a scenario whereby UE 1 loses its connection to the WLAN 420 and thereby drops its association with the proxy client 605. FIG. 9B is similar to FIG. 9A, except that in FIG. 9B the proxy client 605 is responsible for notifying the application server 170 regarding UE 1's disassociation from the proxy client 605, instead of UE 1 as in FIG. 9A.

Referring to FIG. 9B, at some point after 875 of FIG. 8, assume that UE 1 exits the coverage area 600 of the WLAN 420, 900B. Accordingly, UE 1 is now unable to receive the IP multicast traffic that is re-transmitted by the proxy client 605 throughout the coverage area 600 of the WLAN 420. At some point after UE 1's disconnection from the WLAN 420, the proxy client 905B detects UE 1's disconnection and determines that UE 1 is no longer associated with the proxy client 605, 905B. For example, so long as UEs remain associated with the proxy client 605 within the WLAN 420, the UEs may each be required to send periodic keep-alive packets to the proxy client 605 in order to maintain their association with the proxy client 605. Accordingly, the detection of 905B may correspond to a determination, by the proxy client 605, that a threshold period of time has elapsed from a previous keep-alive packet from UE 1 based on an expiration of a keep-alive timer for UE 1.

Upon detecting UE 1's disassociation from the proxy client 605, the proxy client 605 transmit a notification over the WWAN-based IP unicast connection to the application server 170 that indicates UE 1 is no longer associated with the proxy client 605 within the WLAN 420, 910B. After 910B, 915B through 945B substantially correspond to 910A through 940A, respectively, of FIG. 9A, and as such will not be described further for the sake of brevity.

Referring to FIGS. 9A and 9B, UE 1's disassociation is described as being a result of UE 1 exiting the coverage area 600 of the WLAN 420 while still remaining in the group communication session via the WWAN 400 after the disconnection. In another example implementation, a user of UE 1 may simply decide to drop out of the group communication entirely, irrespective of whether UE 1 remains inside of or outside of the coverage area 600 of the WLAN 420. In this case, it will be appreciated that the application server 170 may still be notified of UE 1's disassociation from the proxy client 605 but that the application server 170 would not resume support for the group communication session to UE 1 over the WWAN 400 after the disassociation.

With respect to FIGS. 6 through 9B, UEs 1 . . . N are generally described as being recipients or targets of traffic associated with the group communication session. However, it is also possible that one or more of UEs 1 . . . N may transmit to the communication group from time to time. For example, if the group communication session corresponds to a half-duplex or hybrid-duplex PTT session, a particular UE or set of UEs among UEs 1 . . . N may correspond to floor-holders that transmit media (e.g., video, audio, etc.) to the rest of the group. Accordingly, FIGS. 10A and 10B are directed to examples whereby a given UE that is supported by the proxy client 605 can send data (e.g., media, signaling messages such as floor-request messages, etc.) to the application server 170 during the group communication session. In particular, FIG. 10A is directed to an implementation whereby reverse-link data is transmitted from UE 1 to the application server 170 via the proxy client 605 in accordance with an embodiment of the invention, and FIG. 10B is directed to an implementation whereby reverse-link data is transmitted from UE 1 to the application server 170 directly (i.e., not through the proxy client 605) in accordance with an embodiment of the invention.

Referring to FIG. 10A, during the processes of FIG. 7B or FIG. 8 while UE 1 is participating in the group communication session via the proxy client 605 within the WLAN 420, UE 1 determines whether to transmit data to the application server 170, 1000A. As noted above, the data can correspond to a floor-request message, media to be transmitted to UEs 2 . . . N and/or other data.

In the embodiment of FIG. 10A, assume that UE 1 determines to transmit the data to the application server 170 in 1000A. Accordingly, in 1005A, UE 1 sends the data to the proxy client 605 via IP unicast within the WLAN 420. For example, an IP address or unicast MAC ID of the proxy client 605 may be conveyed to UE 1 during UE 1's earlier registration with the proxy client 605 at 745A of FIG. 7A, and UE 1 may use the IP address or unicast MAC ID to transmit the data to the proxy client 605 at 1005A. Upon receiving the data from UE 1, the proxy client 605 transmits the data from UE 1 to the application server 170 on behalf of UE 1 over the WWAN 400, 1010A.

Referring to FIG. 10B, during the processes of FIG. 7B or FIG. 8 while UE 1 is participating in the group communication session via the proxy client 605 within the WLAN 420, UE 1 determines whether to transmit data to the application server 170, 1000B. As noted above, the data can correspond to a floor-request message, media to be transmitted to UEs 2 . . . N and/or other data. In the embodiment of FIG. 10B, assume that UE 1 determines to transmit the data to the application server 170 in 1000B. Accordingly, in 1005B, UE 1 sends the data to the application server 170 in a direct manner over the WWAN 400, i.e., not through the proxy client 605, 1005B.

In the embodiments described with respect to FIGS. 6 through 10A, the proxy client 605 is described as connected to the application server 170 via a WWAN-based IP unicast connection, whereby downlink session traffic for UEs supported by the proxy client 605 is received over the WWAN-based IP unicast connection and then re-transmitted via IP multicast over the WLAN 420 and uplink session traffic for UEs is sent to the proxy client 605 over the WLAN 420 and then re-transmitted to the application server over the WWAN-based IP unicast connection. However, in other embodiments, the IP unicast connection between the proxy client 605 and the application server 170 can instead be implemented as a WLAN-based IP unicast connection. In this case, a WLAN-to-WWAN connection can be established between the proxy client 605 and the application server 170 by punching through the NATs and/or Firewalls within the WLAN 420 and WWAN 400 as discussed above with respect to FIGS. 5A and 5B, in an example.

While the embodiments described above describe UEs that connect to a proxy client located behind the NAT and/or firewall of a WLAN, it will be appreciated that other embodiments can be directed to proxy clients that are connected through other types of local (or short-range) wireless networks that are separate from the WWAN, such as a Bluetooth pico-cell, for example.

While references in the above-described embodiments of the invention have generally used the terms 'call' and 'session' interchangeably, it will be appreciated that any call and/or session is intended to be interpreted as inclusive of actual calls between different parties, or alternatively to data transport sessions that technically may not be considered as 'calls'. Also, while above-embodiments have generally described with respect to PTT sessions, other embodiments can be directed to any type of communication session, such as a push-to-transfer (PTX) session, an emergency VoIP call, etc.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of non-transitory storage medium known in the art. An exemplary non-transitory storage medium is coupled to the processor such that the processor can read information from, and write information to, the non-transitory storage medium. In the alternative, the non-transitory storage medium may be integral to the processor. The processor and the non-transitory storage medium may reside in an ASIC. The ASIC may reside in a user terminal (e.g., access terminal). In the alternative, the processor and the non-transitory storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a non-transitory computer-readable medium. Non-transitory computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other non-transitory medium that can be used to carry or store desired program code in the form of instructions or data structures and that can be accessed by a computer. Also, any connection is properly termed a non-transitory computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of extending support of a group communication session to a set of user equipments (UEs) within a local wireless network, the group communication session arbitrated by an application server in a wireless wide area network (WWAN) that is separate from the local wireless network, comprising:
   establishing an Internet Protocol (IP) unicast connection between the application server and a proxy client of the application server;
   associating, at the proxy client of the application server, with at least one UE over the local wireless network;
   transmitting a notification configured to notify the application server of the proxy client's association with the at least one UE;
   associating, at the proxy client, with at least one additional UE over the local wireless network;
   transmitting another notification configured to notify the application server of the proxy client's association with the at least one additional UE;
   receiving, responsive to the transmitted notifications, traffic associated with the group communication session and targeted to the at least one UE and the at least one additional UE over the IP unicast connection; and
   re-transmitting, from the proxy client to the at least one UE and the at least one additional UE, the received traffic via IP multicast within the local wireless network.

2. The method of claim 1, wherein the IP unicast connection between the application server and the proxy client of the application server is established over the WWAN.

3. The method of claim 1, wherein the IP unicast connection between the application server and the proxy client of the application server is established over the local wireless network.

4. The method of claim 1, wherein the local wireless network corresponds to a wireless local area network (WLAN).

5. The method of claim 1, wherein the notification is transmitted over the IP unicast connection.

6. The method of claim 1, further comprising:
   detecting, at the proxy client, that the at least one UE is no longer associated with the proxy client over the local wireless network; and
   transmitting a supplemental notification configured to notify the application server of the proxy client's disassociation from the at least one additional UE.

7. The method of claim 1, further comprising:
   receiving, from the at least one UE over the local wireless network, data for transmission to the application server; and
   transmitting the received data from the proxy client to the application server on behalf of the at least one UE.

8. The method of claim 7, wherein the received data that is transmitted from the proxy client to the application server on behalf of the at least one UE is transmitted over the IP unicast connection.

9. The method of claim 1, wherein the proxy client is a dedicated proxy client that performs a proxy function for the application server without being a client device that is participating in the group communication session.

10. A method of obtaining support for a group communication session at a user equipment (UE) within a local wireless network, the group communication session arbitrated by an application server in a wireless wide area network (WWAN) that is separate from the local wireless network, comprising:
    detecting the local wireless network while participating in the group communication session via an independent WWAN connection;
    establishing a connection to the local wireless network;
    detecting a presence of a proxy client of the application server via the established connection;
    associating, at the UE in response to the detected presence of the proxy client, with the proxy client over the local wireless network; and
    receiving, responsive to the association and over the local wireless network, traffic associated with the group communication session that is initially received at the proxy client from the application server on an Internet Protocol (IP) unicast connection and then re-transmitted within the local wireless network from the proxy client to the UE via IP multicast.

11. The method of claim 10, wherein (i) receipt of an acknowledgment from the proxy client or (ii) the received traffic from the proxy client via IP multicast corresponds to a transition of the UE from participating in the group communication session over the WWAN to participating in the group communication session over the local wireless network via the proxy client.

12. The method of claim 10, wherein the IP unicast connection is established over the WWAN.

13. The method of claim 10, wherein the IP unicast connection is established over the local wireless network.

14. The method of claim 10, wherein the local wireless network corresponds to a wireless local area network (WLAN).

15. The method of claim 10, further comprising:
    determining, at the UE, that the UE is no longer associated with the proxy client; and
    transmitting, over the WWAN, a notification configured to notify the application server of the proxy client's disassociation from the proxy client.

16. The method of claim 15, wherein the determination that the UE is no longer associated with the proxy client is based upon the UE exiting a coverage area of the local wireless network.

17. The method of claim 10, further comprising:
    determining to transmit reverse-link data to the application server during the group communication session; and
    transmitting the reverse-link data to the application server on a given connection that is independent of the proxy client.

18. The method of claim 17, wherein the given connection is over the WWAN or over the local wireless network connection.

19. The method of claim 17, wherein the given connection is over the WLAN.

20. The method of claim 10, further comprising:
    determining to transmit reverse-link data to the application server during the group communication session; and
    transmitting the reverse-link data to the application server through the proxy client.

21. A method of extending support of a group communication session to a set of user equipments (UEs) within a local wireless network, the group communication session arbitrated by an application server in a wireless wide area network (WWAN) that is separate from the local wireless network, comprising:
    receiving, at the application server, a notification that a proxy client operating in the local wireless network is associated with at least one UE configured to participate in the group communication session;
    maintaining a list of UEs associated with the proxy client at the application server; and
    transmitting, to the proxy client responsive to the received notification, traffic associated with the group communication session and directed to each listed UE on an Internet Protocol (IP) unicast connection between the proxy client and the application server.

22. The method of claim 21, wherein the IP unicast connection between the application server and the proxy client is established over the WWAN.

23. The method of claim 21, wherein the IP unicast connection between the application server and the proxy client is established over the local wireless network.

24. The method of claim 21, further comprising:
    transmitting the same traffic to a different set of UEs that is not associated with the proxy client over a separate connection over the WWAN.

25. The method of claim 21, wherein the local wireless network corresponds to a wireless local area network (WLAN).

26. The method of claim 21, wherein the traffic transmitted to the proxy client in association with the group communication session is expected to terminate at each listed UE via an IP multicast re-transmission from the proxy client to the listed UEs within the local wireless network.

27. The method of claim 21, further comprising:
    receiving another notification configured to notify the application server of the proxy client's association with at least one additional UE,
    wherein the maintaining step updates the list of UEs to include the at least one additional UE.

28. The method of claim 21, further comprising:
    receiving another notification configured to notify the application server of a dissociation of the proxy client from one or more UEs to which the proxy client was previously associated,
    wherein the maintaining step updates the list of UEs to omit the one or more disassociated UEs.

29. The method of claim 21, further comprising:
    receiving data during the group communication session from the at least one UE via a connection that is independent of the proxy client.

30. The method of claim 29, wherein the connection is over the WWAN or over the local wireless network connection.

31. The method of claim 29, wherein the connection is over a wireless local area network (WLAN).

32. The method of claim 21, further comprising:
    receiving data during the group communication session from the at least one UE through the proxy client.

33. The method of claim 21, wherein the proxy client is a dedicated proxy client that performs a proxy function for the application server without being a client device that is participating in the group communication session.

34. A proxy client configured to extend support of a group communication session to a set of user equipments (UEs) within a local wireless network, the group communication session arbitrated by an application server in a wireless wide area network (WWAN) that is separate from the local wireless network, comprising:
    means for establishing an Internet Protocol (IP) unicast connection between the application server and the proxy client of the application server;
    means for associating with at least one UE over the local wireless network;
    means for transmitting a notification configured to notify the application server of the proxy client's association with the at least one UE;
    means for associating, at the proxy client, with at least one additional UE over the local wireless network;
    means for transmitting another notification configured to notify the application server of the proxy client's association with the at least one additional UE;
    means for receiving, responsive to the transmitted notifications, traffic associated with the group communication session and targeted to the at least one UE and the at least one additional UE over the IP unicast connection; and
    means for re-transmitting, to the at least one UE and the at least one additional UE, the received traffic via IP multicast within the local wireless network.

35. A user equipment (UE) configured to obtain support for a group communication session within a local wireless network, the group communication session arbitrated by an application server in a wireless wide area network (WWAN) that is separate from the local wireless network, comprising:
    means for detecting the local wireless network while participating in the group communication session via an independent WWAN connection;
    means for establishing a connection to the local wireless network;
    means for detecting a presence of a proxy client of the application server via the established connection;

means for associating with the proxy client over the local wireless network in response to the detected presence of the proxy client; and means for receiving, responsive to the association and over the local wireless network, traffic associated with the group communication session that is initially received at the proxy client from the application server on an Internet Protocol (IP) unicast connection and then re-transmitted within the local wireless network from the proxy client to the UE via IP multicast.

36. An application server configured to extend support of a group communication session to a set of user equipments (UEs) within a local wireless network, the group communication session arbitrated by the application server in a wireless wide area network (WWAN) that is separate from the local wireless network, comprising:

means for receiving a notification that a proxy client operating in the local wireless network is associated with at least one UE configured to participate in the group communication session;

means for maintaining a list of UEs associated with the proxy client at the application server; and means for transmitting, to the proxy client responsive to the received notification, traffic associated with the group communication session and directed to each listed UE on an Internet Protocol (IP) unicast connection between the proxy client and the application server.

37. A proxy client configured to extend support of a group communication session to a set of user equipments (UEs) within a local wireless network, the group communication session arbitrated by an application server in a wireless wide area network (WWAN) that is separate from the local wireless network, comprising:

logic configured to establish an Internet Protocol (IP) unicast connection between the application server and the proxy client of the application server;

logic configured to associate with at least one UE over the local wireless network;

logic configured to transmit a notification configured to notify the application server of the proxy client's association with the at least one UE;

logic configured to associate, at the proxy client, with at least one additional UE over the local wireless network;

logic configured to transmit another notification configured to notify the application server of the proxy client's association with the at least one additional UE;

logic configured to receive, responsive to the transmitted notifications, traffic associated with the group communication session and targeted to the at least one UE and the at least one additional UE over the IP unicast connection; and logic configured to re-transmit, to the at least one UE and the at least one additional UE, the received traffic via IP multicast within the local wireless network.

38. A user equipment (UE) configured to obtain support for a group communication session within a local wireless network, the group communication session arbitrated by an application server in a wireless wide area network (WWAN) that is separate from the local wireless network, comprising:

logic configured to detect the local wireless network while participating in the group communication session via an independent WWAN connection;

logic configured to establish a connection to the local wireless network;

logic configured to detect a presence of a proxy client of the application server via the established connection;

logic configured to associate with the proxy client over the local wireless network in response to the detected presence of the proxy client; and logic configured to receive, responsive to the association and over the local wireless network, traffic associated with the group communication session that is initially received at the proxy client from the application server on an Internet Protocol (IP) unicast connection and then re-transmitted within the local wireless network from the proxy client to the UE via IP multicast.

39. An application server configured to extend support of a group communication session to a set of user equipments (UEs) within a local wireless network, the group communication session arbitrated by the application server in a wireless wide area network (WWAN) that is separate from the local wireless network, comprising:

logic configured to receive a notification that a proxy client operating in the local wireless network is associated with at least one UE configured to participate in the group communication session;

logic configured to maintain a list of UEs associated with the proxy client at the application server based at least in part on the notification; and logic configured to transmit, to the proxy client responsive to the received notification, traffic associated with the group communication session and directed to each listed UE on an Internet Protocol (IP) unicast connection between the proxy client and the application server.

40. A non-transitory computer-readable storage medium containing instructions stored thereon, which, when executed by a proxy client configured to extend support of a group communication session to a set of user equipments (UEs) within a local wireless network, the group communication session arbitrated by an application server in a wireless wide area network (WWAN) that is separate from the local wireless network, cause the proxy client to perform operations, the instructions comprising:

program code to establish an Internet Protocol (IP) unicast connection between the application server and the proxy client of the application server;

program code to associate with at least one UE over the local wireless network;

program code to transmit a notification configured to notify the application server of the proxy client's association with the at least one UE;

program code to associate, at the proxy client, with at least one additional UE over the local wireless network;

program code to transmit another notification configured to notify the application server of the proxy client's association with the at least one additional UE;

program code to receive, responsive to the transmitted notifications, traffic associated with the group communication session and targeted to the at least one UE and the at least one additional UE over the IP unicast connection; and program code to re-transmit, to the at least one UE and the at least one additional UE, the received traffic via IP multicast within the local wireless network.

41. A non-transitory computer-readable storage medium containing instructions stored thereon, which, when executed by a user equipment (UE) configured to obtain support for a group communication session within a local wireless network, the group communication session arbitrated by an application server in a wireless wide area network (WWAN) that is separate from the local wireless network, cause the UE to perform operations, the instructions comprising:

program code to detect the local wireless network while participating in the group communication session via an independent WWAN connection;
program code to establish a connection to the local wireless network;
program code to detect a presence of a proxy client of the application server via the established connection;
program code to associate with the proxy client over the local wireless network in response to the detected presence of the proxy client; and
program code to receive, responsive to the association and over the local wireless network, traffic associated with the group communication session that is initially received at the proxy client from the application server on an Internet Protocol (IP) unicast connection and then re-transmitted within the local wireless network from the proxy client to the UE via IP multicast.

42. A non-transitory computer-readable storage medium containing instructions stored thereon, which, when executed by an application server configured to extend support of a group communication session to a set of user equipments (UEs) within a local wireless network, the group communication session arbitrated by the application server in a wireless wide area network (WWAN) that is separate from the local wireless network, cause the application server to perform operations, the instructions comprising:
program code to receive a notification that a proxy client operating in the local wireless network is associated with at least one UE configured to participate in the group communication session;
program code to maintain a list of UEs associated with the proxy client at the application server based at least in part on the notification; and
program code to transmit, to the proxy client responsive to the received notification, traffic associated with the group communication session and directed to each listed UE on an Internet Protocol (IP) unicast connection between the proxy client and the application server.

43. A method of obtaining support for a group communication session at a user equipment (UE) within a local wireless network, the group communication session arbitrated by an application server in a wireless wide area network (WWAN) that is separate from the local wireless network, comprising:
associating, at the UE, with a proxy client of the application server over the local wireless network;
receiving, responsive to the association and over the local wireless network, traffic associated with the group communication session that is initially received at the proxy client from the application server on an Internet Protocol (IP) unicast connection and then re-transmitted within the local wireless network from the proxy client to the UE via IP multicast;
determining to transmit reverse-link data to the application server during the group communication session; and
transmitting the reverse-link data to the application server (i) through the proxy client or (ii) on a connection that is independent of the proxy client.

\* \* \* \* \*